(12) United States Patent
Dillon

(10) Patent No.: US 11,252,089 B2
(45) Date of Patent: Feb. 15, 2022

(54) MULTI-PHASE IP-FLOW-BASED CLASSIFIER WITH DOMAIN NAME AND HTTP HEADER AWARENESS

(71) Applicant: HUGHES NETWORK SYSTEMS, LLC, Germantown, MD (US)

(72) Inventor: Douglas M. Dillon, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 0 days.

(21) Appl. No.: 16/023,680

(22) Filed: Jun. 29, 2018

(65) Prior Publication Data

US 2018/0309680 A1 Oct. 25, 2018

Related U.S. Application Data

(62) Division of application No. 14/702,665, filed on May 1, 2015, now Pat. No. 10,044,620.

(51) Int. Cl.
| | |
|---|---|
| *H04L 12/801* | (2013.01) |
| *H04L 29/08* | (2006.01) |
| *H04L 47/12* | (2022.01) |
| *H04L 67/02* | (2022.01) |
| *H04L 47/2483* | (2022.01) |
| *H04L 47/2441* | (2022.01) |

(Continued)

(52) U.S. Cl.
CPC .......... *H04L 47/12* (2013.01); *H04L 47/2441* (2013.01); *H04L 47/2483* (2013.01); *H04L 61/1511* (2013.01); *H04L 61/6009* (2013.01); *H04L 67/02* (2013.01); *H04L 67/327* (2013.01); *H04L 69/22* (2013.01)

(58) Field of Classification Search
CPC .......... H04L 29/12066; H04L 61/1511; H04L 63/0236; H04L 63/20; H04L 63/1408; H04L 63/1416; H04L 67/02; H04L 47/2483; H04L 47/2441
USPC ................ 370/230, 232, 235, 252; 713/168; 709/224, 222
See application file for complete search history.

(56) References Cited

U.S. PATENT DOCUMENTS 7,814,204 B1    10/2010  Wang et al.
8,977,728 B1 *   3/2015  Martini ............... H04L 61/1511
                                                       709/222

(Continued)

FOREIGN PATENT DOCUMENTS

WO    2015014396 A1    2/2015

OTHER PUBLICATIONS

International Search Report in PCT/US2016/029676, dated Sep. 7, 2016.

(Continued)

*Primary Examiner* — Harun Chowdhury
(74) *Attorney, Agent, or Firm* — Jones Robb, PLLC

(57) ABSTRACT

An apparatus and method for classifying traffic data in a communication network based on IP flow. Traffic data in a communication network is monitored in order to detect an IP flow. A preliminary classification is assigned to the IP flow based on protocol information contained in its first packet. Subsequent packets within the IP flow are further monitored, and the IP flow is reclassified based, in part, on the domain name of the responding server. Web pages can also be classified, and monitored to determine their response time.

12 Claims, 9 Drawing Sheets

(51) Int. Cl.
    *H04L 67/63*     (2022.01)
    *H04L 69/22*     (2022.01)
    *H04L 61/4511*     (2022.01)
    *H04L 61/58*     (2022.01)

(56) References Cited

U.S. PATENT DOCUMENTS

| | | |
|---|---|---|
| 9,015,318 B1 | 4/2015 | Batz et al. |
| 10,044,620 B2 | 8/2018 | Dillon |
| 2002/0032029 A1 | 3/2002 | Angin |
| 2004/0015725 A1 | 1/2004 | Boneh |
| 2004/0093419 A1 | 5/2004 | Weihl et al. |
| 2007/0288619 A1 | 12/2007 | Jun et al. |
| 2009/0210479 A1 | 8/2009 | Ahmed et al. |
| 2010/0153539 A1* | 6/2010 | Zarroli ............... H04L 67/02 709/224 |
| 2012/0096261 A1* | 4/2012 | Ko ............... H04L 63/0236 713/168 |
| 2013/0100849 A1 | 4/2013 | Szabo |
| 2014/0064080 A1* | 3/2014 | Stevens ............... H04L 47/2483 370/235 |
| 2014/0215628 A1 | 7/2014 | Yan |
| 2014/0310392 A1 | 10/2014 | Ho |
| 2014/0359065 A1 | 12/2014 | Liu |
| 2015/0120909 A1 | 4/2015 | Karthikeyan |
| 2016/0173390 A1* | 6/2016 | Munoz Kirschberg ............... H04L 47/2483 370/232 |
| 2016/0255047 A1 | 9/2016 | Parthasarathy |
| 2016/0277293 A1 | 9/2016 | Lopez |
| 2016/0308986 A1 | 10/2016 | Bar-Yanai et al. |
| 2016/0323186 A1 | 11/2016 | Dillon |
| 2018/0309678 A1 | 10/2018 | Dillon |
| 2018/0309679 A1 | 10/2018 | Dillon |

OTHER PUBLICATIONS

Communication in EP Application No. 16789776.8, dated Jan. 23, 2019.
Non-Final Office Action in U.S. Appl. No. 16/023,510, dated Aug. 15, 2019.
Non-Final Office Action in U.S. Appl. No. 16/023,573, dated Sep. 25, 2019.
European Examination Report issued in European Application No. 16 789 776.8, dated Jan. 3, 2020.
European Examination Report issued in European Application No. 16 789 776.8, dated Nov. 4, 2020.

* cited by examiner

MULTI-PHASE IP-FLOW-BASED CLASSIFIER WITH DOMAIN NAME AND HTTP HEADER AWARENESS

CROSS-REFERENCE TO RELATED APPLICATIONS

This is a Divisional Application of U.S. patent application Ser. No. 14/702,665, filed May 1, 2015, an application related U.S. application Ser. No. 13/599,765 entitled "Apparatus And Method For Staged Traffic Classification Among Terminal And Aggregation Nodes Of A Broadband Communications System," the contents of which are hereby incorporated by reference.

BACKGROUND INFORMATION

A continually increasing trend facing service providers of voice and communication networks is the seemingly endless level of bandwidth required by consumers and content providers. Consumers utilize devices such as mobile phones, tablets, computers, etc. to obtain various types of content which can often require greater bandwidth and a higher quality of service than only a short period of time prior.

For example, mobile phones are no longer used simply for web browsing and light data communications. Consumers often use these devices for video conferencing and real-time massively multiplayer gaming that require a constant exchange of significant amounts of data. Consumers also frequently share videos and images that have increased in size due to improvements in the optical qualities of mobile devices. Many content providers allow consumer to stream the contents of television and sporting events directly to devices such as mobile phones and tablets. It is not uncommon for certain consumers to receive all of their television programming, including on-demand movie over broadband communication networks.

As consumers continue to increase the amount of information carried over the communication network, various concerns become more apparent. For example, a service provider may face difficulties allocating bandwidth for all the content while maintaining a required quality of service. The manner in which data associated with this content is processed can often have a direct effect on things such as congestion and delays. For example, efficient routing and classification of data can reduce delays that appear to be bandwidth related.

It is not always possible to physically increase bandwidth due to the costs associated with deploying the infrastructure. Service providers, therefore, can face many challenges in attempting to maintain consumer satisfaction with limited network capacity. Based on the foregoing, there is a need for an approach which improves one or more aspects in processing data within a broadband communication network.

BRIEF SUMMARY

An apparatus and method for classifying traffic data in a communication network based on IP flow. According to an embodiment, a method comprises identifying, at a gateway, an IP flow from traffic data in a communication network, the IP flow including two or more packets having common transport level end points; assigning a preliminary classification indicative of at least a priority to the IP flow based on protocol information contained in a first packet of the IP flow; creating an entry in an IP flow cache which maintains information pertaining to all open IP flows; consulting a cache including previous domain name and server IP address associations obtained from analysis of prior IP flow and/or UDP domain name lookups; determining a domain name associated with a server end of the IP flow based on the consulting; associating the domain name with the IP flow; and assigning an initial classification indicative of at least a priority to the IP flow based, at least in part, on the domain name and an early classification cache lookup, wherein entries in the early classification cache are keyed either by a network identifier index, domain name, and server port number, or by a network identifier index, server domain, and server port number, wherein the initial classification replaces the preliminary classification.

According to another embodiment, a gateway comprises one or more processors configured to: identify an IP flow from traffic data in a communication network, the IP flow including two or more packets having common transport level end points; assign a preliminary classification indicative of at least a priority to the IP flow based on protocol information contained in a first packet of the IP flow; create an entry in an IP flow cache which maintains information pertaining to all open IP flows; consult a cache including previous domain name and server IP address associations obtained from analysis of prior IP flow and/or UDP domain name lookups; determine a domain name associated with a server end of the IP flow based on the consulting; associate the domain name with the IP flow; and assign an initial classification indicative of at least a priority to the IP flow based, at least in part, on the domain name and an early classification cache lookup, wherein entries in the early classification cache are keyed either by a network identifier index, domain name, and server port number, or by a network identifier index, server domain, and server port number, wherein the initial classification replaces the preliminary classification.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

An apparatus and method for classifying traffic data in a communication system is described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
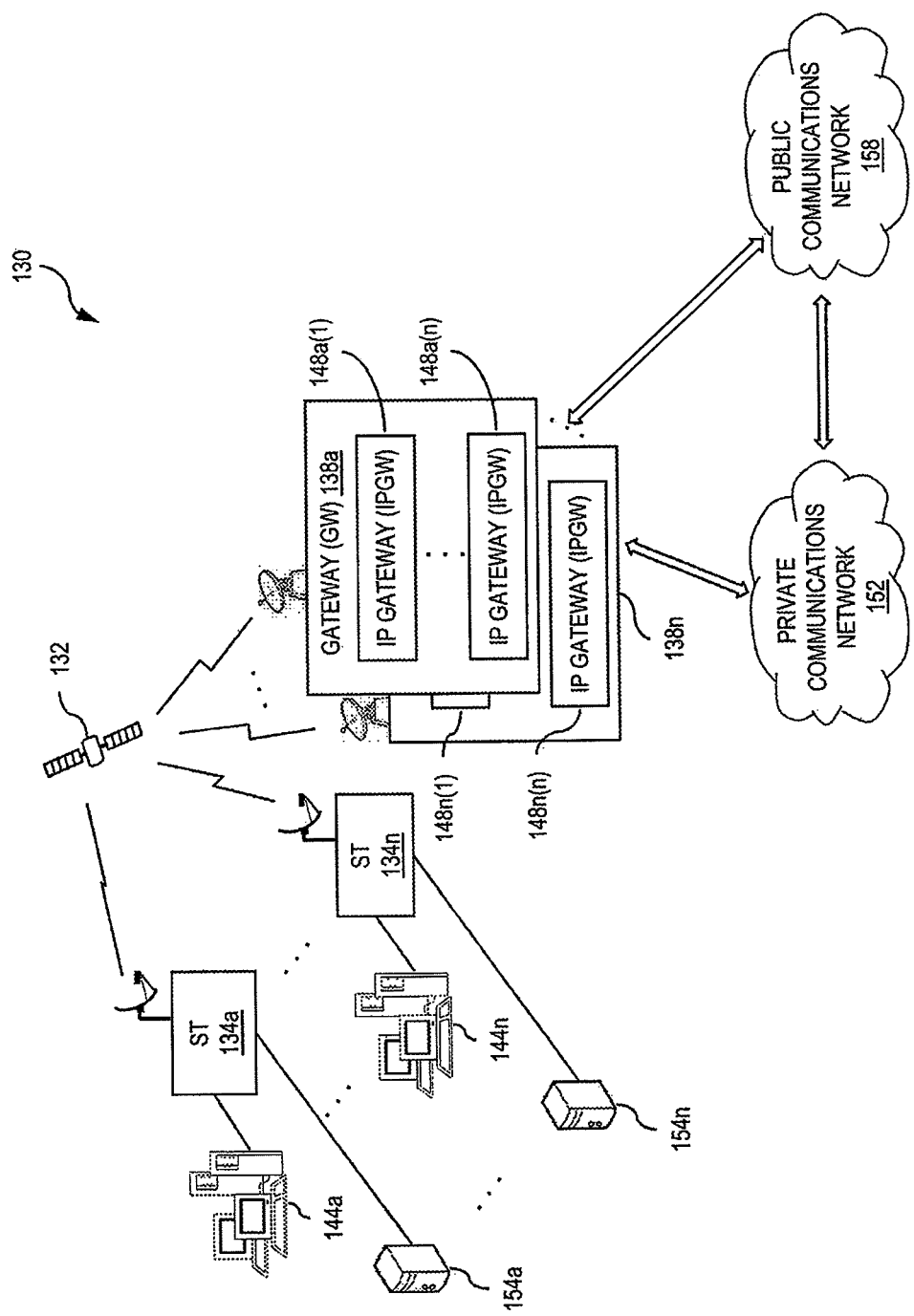
FIG. 1 is a diagram of a communication system capable of employing multiphase classification, according to one or more embodiments.

FIG. 1 illustrates an exemplary communication system 130 capable of supporting communications among terminals with varied capabilities, according to one or more embodiments. The communication system 130 includes a satellite 132 that supports communications among multiple satellite terminals (STs) 134a-134n, and a number of gateways (GWs) 138a-138n. According to various embodiments, the Satellite link constitutes a Wide-Area Network (WAN). Each ST 134 can be configured for relaying traffic from its Internet Access customer premise equipment (144) to the public Internet 156, and from its private network customer premise equipment (154) across the WAN to its designated IPGW 148. The IPGW 148 can be configured to route this traffic across the private network 152 and public Internet 156 as appropriate. The IPGW 148 can be further configured to route traffic from the private network 152 and public Internet 156 across the satellite link to the appropriate ST 134. The ST 134 then routes the traffic to the appropriate private network 152 customer premise equipment 154 or Internet Access Customer Premise equipment 144. As will be described in greater detail below, various embodiments provide a multiphase classifier capable of residing within the ST 134 and/or within the IPGW 154. The multiphase classifier can be configured to classify traffic in preparation for transmission across the satellite link.

As illustrated in FIG. 1, the communication system 130 facilitates communication between a satellite network, private communication networks 152, and public communication networks 158. Various embodiments, however can also be configured for providing communication within only a terrestrial network (e.g., private communication networks 152 and public communication networks 158), or within only a satellite network. Thus, while components such as the STs 134 and IPGW 148 may be used in a satellite communication system, other network components such as, for example, a VPN router and a VPN gateway can be provided in place of the ST 134 and the IPGW 148, respectively. Furthermore, various embodiments can be incorporated within a router having QoS capabilities. Accordingly, the communication system 130 illustrated in FIG. 1 is only intended to be illustrative, and in no way restrictive.

Figure 2A:
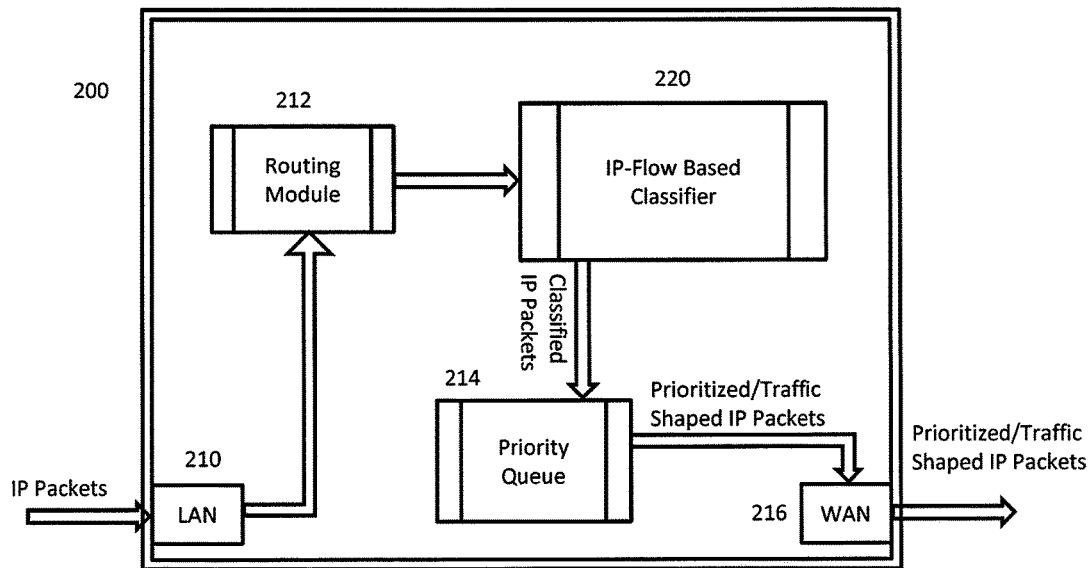
FIG. 2A is a diagram of a multiphase classifier embodied in a network component, according to at least one embodiment.

FIG. 2A illustrates a system which incorporates a multiphase IP flow-based classifier in accordance with at least one embodiment. The system is illustrated in the form of a portion or a router 200 handling outbound traffic which incorporates various components necessary for facilitating the flow of traffic data within a communication network. For example, the outbound portion of the router 200 can include interfaces to one or more local area network (LAN) ports 210 which allow various devices such as workstations, laptops, printers, etc. to transmit information across a wide area network via a WAN interface 216. According to the illustrated embodiment, network devices such as workstations transmit data in the form of IP packets. Although the router 200 illustrates a single LAN interface 210, it should be noted that multiple LAN interfaces 210 can be provided. Furthermore, the router 200 can also incorporate a wireless transceiver which allows for wireless communication with various devices such as tablets, laptops, etc. The router 200 includes a routing module 212 which receives the upstream (or outbound) IP packets from the various devices, and applies the necessary routing algorithms to ensure that the IP packets are directed to their destinations along an appropriate path.

A multiphase classifier 220 examines the IP packets received from the routing module 212 and performs the necessary processing to classify traffic data based on various criteria, as will be discussed in greater details below. According to various embodiments, the multiphase classifier 220 classifies the traffic data in accordance with specific IP flows, rather than on a packet by packet basis. The multiphase classifier 220, therefore, must first determine the IP flow to which a particular packet belongs. An IP flow is defined as a unidirectional set of packets, wherein all packets in the flow have the same transport level end points. In the case of transmission control protocol (TCP) and user datagram protocol (UDP) packets, an IP flow can be identified by the protocol type (TCP or UDP), the source IP address, source port, destination IP address, and destination port.

While FIG. 2A illustrates the multiphase classifier 220 as part of the router 200, it should be appreciated, that various other embodiments and configurations are possible. For example, the multiphase classifier 220 can be configured as part of any network component that performs, or requires, classification functions. Furthermore, the multiphase classifier 220 can be configured as a unidirectional component which classifies individual IP flows, thus requiring a complimentary component which classifies reverse IP flows.

According to at least one embodiment, the classification of a packet is determined based, at least in part, on state information maintained by the multiphase classifier 220 for its specific IP flow. Due to its unidirectional configuration, most IP flows will also have a matching IP flow in the reverse direction. For example, a typical TCP connection would contain an outbound unidirectional IP flow and a matching inbound unidirectional IP flow. The inbound IP flow is referred to as the "reverse flow" (or reverse IP flow) for the corresponding outbound IP flow, or vice versa. The classified IP packets are then directed to a priority queue 214 that prioritizes and queues the packets in accordance with the classification assigned by the multiphase classifier 220. The priority queue 214 can further incorporate rate limiting functions which allow it to apply specific rate restrictions in order to satisfy a required quality of service (QoS). The prioritized and traffic-shaped IP packets are then directed to a wide area network (WAN) interface 216 which functions as a physical connection for directing outbound traffic. According to at least one embodiment, the priority queue 214 further determines an appropriate order and pacing for the packets in order to avoid overloading the capacity of the broadband transport and to optimize QoS performance.

Figure 2B:
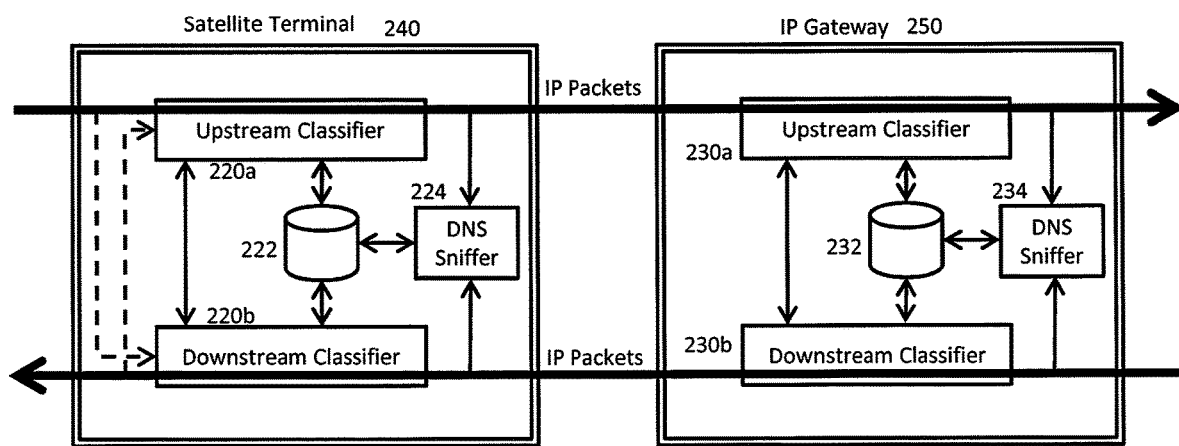
FIG. 2B is a diagram of a multiphase classifier embodied in a pair of network components, according to at least one embodiment.

FIG. 2B is a diagram of a multiphase classifier embodied in a pair of network components, according to at least one embodiment. According to the illustrated embodiment, the network components can be a pair of peered network components such as a VPN router and a VPN GW. According to another embodiment, the peered network components can be an ST 134 and IPGW 148 (see FIG. 1). FIG. 2B further illustrates the interaction of various components during classification of IP packets. As previously discussed, the multiphase classifier can be configured in various ways, and embodied in different network components. According to the illustrated embodiment, the multiphase classifier is configured in a unidirectional manner consistent with the flow of IP packets. More particularly, and upstream classifier 220a performs classification for IP packets that are traveling upstream from, for example, a client workstation to an external destination via a broadband communication network, such as the Internet. A downstream classifier 220b is used to perform classification functions of IP packets that are incoming to the client workstation.

As further illustrated in FIG. 2B, at least one embodiment allows the upstream classifier 220a and the downstream classifier 220b to be configured such that information regarding the packets and/or IP flows being classified can be exchanged. In such configurations, however, the upstream classifier 220a does not modify or classify downstream IP flows and/or packets. Similarly, the downstream classifier 220b does not modify or classify upstream IP flows and/or packets. According to further embodiments, the upstream classifier 220a can be given read-only access to the downstream IP packets, without any direct communication with the downstream classifier 220b, as indicated by dashed line. The downstream classifier 220b would similarly be given read-only access to the upstream IP packets.

A database 222 is provided for storing information obtained from the IP packets such as end points of various IP flows, contents of HTTP headers, TLS/SSL hello packet information, domain name server (DNS) lookups, etc. The database 222 can also be configured to perform various caching functions for maintaining data structures utilized in classifying the different IP flows. As can be appreciated, the database can be implemented in various manners such as, for example, a RAM-based data structure such as dictionaries and least recently used cache configurations. According to an embodiment, the upstream and downstream classifiers 220a, 220b provide various data in raw form to the database 222. The database 222 supports execution of one or more programs to access the raw data and maintains, for example, one or more cache structures which track the status and/or classification of all active IP flows passing through the multiphase classifier 220. Furthermore, the data can be collected in real-time, thereby allowing the database 222 to maintain an up-to-date status of all IP flows by continuously updating the contents of the cache based on the most current information obtained by the multiphase classifier 220.

According to at least one embodiment, a DNS sniffer 224 can be used to passively monitor both inbound and outbound packets. More particularly, the DNS sniffer 224 is configured to have read-only access to all of the UDP DNS packets passing through the multiphase classifier 220. According to at least one embodiment, the DNS sniffer 224 can monitor UDP DNS packets (i.e., packets with a server port number of 53) in order to obtain responses to DNS requests (or lookups). The information can then be used to construct a DNS database of classification and/or IP flow information for each server's domain name. According to various embodiments, the DNS database can include the domain of each server (i.e., server domain) rather than, or in addition to, the fully qualified domain name. As can be appreciated, the term "server domain" corresponds to the entire domain designated to the server (e.g. .google.com), whereas "domain name" corresponds to a specific server within the server domain (e.g., www.google.com or mail.google.com). The DNS database can then be stored and maintained in the database 222, and accessed by the upstream and downstream classifiers 220a, 220b in order to classify and/or reclassify IP flows. Accordingly, various embodiments allow IP flows to be classified based on server domain, a specific server's domain name, or both.

For example, a DNS lookup that starts with a server's domain name typically returns one of two different kinds of values, namely one or more IP addresses corresponding to the domain name or the canonical name (CNAME) of the server. A further lookup of the CNAME produces one or more IP addresses for that CNAME. These IP addresses correspond to the original server's domain name. According to at least one embodiment, the DNS sniffer 234 monitors UDP DNS packets and builds the database with the information returned from one or both of the foregoing lookups. According to further embodiments, the DNS sniffer 234 further maintains a cache, such as a least-recently used (LRU) cache of DNS requests that is also stored within the database 222. Upon seeing a DNS response, a cache lookup is performed for the DNS response in order to obtain the matching DNS request. When a match is found, a complete DNS lookup transaction can be determined. According to an embodiment a cache lookup can be performed when processing an IP flow for which no server name can be expected (not HTTP, not HTTPS). The cache lookup provides an IP address as a key, and the lookup returns matching domain names for that IP address. Furthermore, the lookup can return the evaluation of those domain names against the classification rules that have a server match condition.

According to an embodiment, the DNS sniffer 224 creates a transaction cache that is stored in the database 232. The transaction cache can include, in part, the lookup name and either CNAME from the response, or the list of IP addresses from the response along with the expiration time and the timestamp of the DNS response. According to such embodiments, the DNS sniffer 224 can provide the multiphase classifier 220 an ability to perform cache lookups based on the IP address of the server. The lookup would return a list of names whose lookup request (either directly or through a CNAME) produced that IP address. The lookup would also return the DNS response timestamp, the expiration time, and whether the name was returned as a CNAME response to another lookup.

As illustrated in FIG. 2B, the multiphase classifier 220 can be embodied within an Acceleration Appliance (AA) 240. As used herein, the term "Acceleration Appliance" refers to any category of networking components capable of performing routing and traffic control functions within, for example, the IP internet layer or OSI layer 3. Such networking components include, but are not limited to: routers, hubs, repeaters, bridges, intranetwork gateways, etc. Depending on the specific network architecture (e.g., terrestrial, satellite, or both), the networking component can also be in the form of a satellite terminal, as illustrated in FIG. 1. Furthermore, the Acceleration Appliance 240 can be provided as a component, or module, of the router 200 itself. As further illustrated in FIG. 2B, the upstream and downstream classifiers 220a, 220b in the Acceleration Appliance 240 exchange IP packets with a corresponding pair of upstream and downstream classifiers 230a, 230b in an IP Gateway (IPGW) 250. The IP Gateway 250 also includes a DNS sniffer 234 which passively accesses the contents of the upstream and downstream packets.

According to one or more embodiments, an acceleration tunnel can be used to support either a separate private network (with its own private domain-name servers) or, for guest traffic, the public Internet, etc. Each acceleration tunnel can be configured to have its own domain namespace. Furthermore, the results of domain name information obtained from one tunnel may only be used for the same tunnel.

According to an embodiment, servers can be grouped into various categories. When a TCP/IP connection is established, for example, a server's identity can be determined through identification of its IP address and port number. This provides a mechanism for categorizing a TCP connection's server in a way that allows the traffic to/from those servers to be classified in a specific fashion. Server category names are used within classification rules to provide a short-hand method of defining the same classification action for a group of related domains and/or domain names. According to a specific implementation, the following categories can be applied:

Preferred—the server's traffic is important and is to be given a preferred class of service over other comparable traffic. A retailer's own web-site is an example of a Preferred server.

PreferredVideo—the server's traffic is typically video and this video is to be given preferred access to bandwidth over other video traffic. Video training is an example of a PreferredVideo server.

PreferredBulk—the server's traffic carries bulk transfers that are to be given a preferred class of service over other bulk traffic. A server receiving inventory update bulk transfers are an example of a PreferredBulk server.

LightInteractive—the server's traffic is consistently light-interactive and would never congest a WAN link. A credit card server is an example of a LightInteractive server.

Discretionary—the server's traffic is carrying discretionary traffic that can be provided a lesser class-of-service than comparable traffic when the WAN is congested.

Discretionary Video—the server's traffic carries video and this video is to be provided a lesser class-of-service than comparable traffic when the WAN is congested. For many guest Wi-Fi applications, video streaming services are examples of discretionary video.

DiscretionaryBulk—the server's traffic carries bulk transfers that are to be given a lower class-of-service than other bulk traffic when the WAN is congested.

It should be noted that a given server IP address can be classified into multiple categories. The servers can also be categorized by rules. According to one specific implementation, these rules can be configured in sets with the following sets available:

"Canned"—these rules are static and can be compiled into the AA 240 or other network module, with an optional parameter available to cause the canned rules to be ignored. These rules cover the most common categorization including video streaming services.

"Common"—these rules, by convention, are common across all enterprises and are dynamically configurable. These rules cover other common categorization and can also be set to be ignored, by configuration parameters.

"Specific"—these rules are, by convention, specific to a site or enterprise.

According to one or more embodiments, the multiphase classifier 220 can be configured to apply various classification override rules (also referred to as: classification rules, acceleration appliance classification override rules, or AaClassificationOverrideRule). The classification rules can be created based on various system requirements, and applied to the upstream and/or downstream IP flow. A classification rule pertaining to port 80 and which applies to both upstream and downstream IP flows would, therefore be applied both HTTP requests and HTTP responses. According to various embodiments, the classification rules can be maintained, for example, in a classification cache (or table) that is stored in the database 222.

The classification rules also can be dynamically created and updated as the multiphase classifier 220 applies information from different servers over time. For example, the classification of IP flows from a new server can be revised over time to more accurately reflect the types of IP flows transmitted from the server. According to at least one embodiment, parameters for classification rules can take the form AaClassificationOverrideRuleXXXX where XXXX starts at 0001 and counts upwards without gaps. Each such parameter designates a set of IP flows, and either: designates such an IP flow's priority, specifies whether such an IP flow should be TCP optimized, or both. For an IP flow to be classified by a rule, it must match all of the rule's match criteria. An AaClassificationOverrideRuleXXXX value is in the form of a Unix command line command (with opcode and flags) whose opcode is "crule". A flag is categorized as either a "match flag" or "action flag":

match flag—defines what it takes for an IP flow to be classified by the rule.

action flag—defines what action takes place when the rule is applied to an IP flow.

The match flags are as follows:

-tosmatch=<hex match val:hex mask val or simply hex match val>, this is an optional flag. When an IP flow's first packet's header's TOS bits (or DSCP bits) masked (bit-wise and'ed) with hex mask val (default is 0xFF when not present) equals the hex match val then this part of the rule matches.

-prot=<icmp, tcp or udp>, this is an optional flag, but the upstreamportmatch and downstreamport match flags may only appear when the -prot flag is present and is tcp or udp.

-upstreamportmatch=<csv list of individual ports or port ranges, e.g. 80:85, or simply 92>, this is an optional flag which may only appear when the -prot flag is present and tcp or udp is specified. Upstream is the destination port of a packet leaving the AA headed for the data center or public Internet. Example: To classify HTTPS, HTTP, FTP control and FTP data TCP flows to/from datacenter or Internet servers use "-upstreamportmatch=443,80,20:21".

-dnstreamportmatch=<csv list of individual ports or port ranges, e.g. 80:85, or simply 92>, this is an optional flag which may only appear when the -prot flag is present and tcp or udp is specified. A match occurs for a downstream flow (entering the AA from the data center or public Internet) whose destination port matches one of the designated ports or for an upstream flow (leaving the AA towards the data center or public Internet) whose source port matches on of the designated ports.

-upstreamipsubnetmatch=<csv list of subNetIpDotNotation: subNetIpMaskDotNotation or more simply ipAddrDotNotation>, this is an optional flag. Upstream refers to the destination of an IP flow leaving the AA headed for the data center or public Internet or the source of an IP flow arriving at the AA from the data center or public Internet. Example: "-upstreamipsubnetmatch=192.168.130.1, 66.82.20.0:255.255.255.0, 66.83.0.0: 255.255.0.0".

-dnstreamipsubnetmatch=<csv list of subNetIpDotNotation: subNetIpMaskDotNotation or more simply ipAddrDotNotation>, this is an optional flag. Dnstream refers to the source of an IP flow leaving the AA headed for the data center or public Internet or the destination of an IP flow arriving at the AA from the data center or public Internet.

-directionmatch=<up,down,both>, this is an optional flag. The default value is "both". When "up" a flow only matches when it is an upstream flow (its packets are moving upstream, usually from a remote LAN to either the private network data center or the Public Internet). When "down" a flow only matches when it is a downstream flow (its packets are moving downstream). -directionmatch is used for asymmetric applications, such as HTTPS web page retrieval, where downstream traffic and upstream traffic are best assigned different priorities.

-servermatch=<CSV list of server categories>, this is an optional flag.

This flag applies when the server is categorized into at least one of the categories in the CSV list. NOTE: When the flow is a UDP flow the server is always considered to be the flow's upstream host. NOTE: The presence of -servermatch flag indicates that the rule is to be applied during initial classification. NOTE: When the matching server category has a match criteria of page-indirect, this rules action is applied to all HTTP and HTTPS transactions which are considered to be part of a page whose first URL matches this rule.

-contentmatch=<CSV list of content type ids>, this is an optional flag. When present and when the flow is HTTP with a content-type field a comparison of the content-type field with the content-type IDs is made to determine whether a match exists. The content-typeIDs in the list are a set of content-types, with optional leading and/or trailing wild-card '*' designators. NOTE: The presence of -contentmatch flag indicates that the rule is to be applied during initial classification.

The action flags are as follows:
-priority=<promote, demote, startbulk, realtime, lightinteractive, heavyinteractive, heavyinteractivegold, heavyinteractivesilver, heavyinteractivebronze, bulk, bulkgold, bulksilver, bulkbronze>, this is an optional flag. When it does not appear either a tcpoptimization flag must appear and the rule applies only to making a tcpoptimization decision without any impact on the flow's classification or an -rtmon flag must appear and the rule applies only to determine whether to response-time monitor the matching web page. The following values provide for adjustments to the default flow classification without forcing a specific priority:

promote—causes the priority assigned to be elevated by one level above the level it would otherwise be assigned (e.g. heavy-interactive gold instead of heavy-interactive silver), but with no promotion for ungoverned traffic (real-time or light-interactive).

demote—cause the priority assigned to be lowered by one level below the level it would otherwise be assigned (e.g. bulk bronze instead of bulk silver), but not below the lowest level (bulk bronze).

startbulk—causes the initial priority of a flow to be set to bulksilver, but where the flow may be promoted should its traffic characteristics warrant such promotion. It is intended to be used primarily with the -contentmatch match flag for content types (e.g. video) that are expected to be bulk.

-tcpoptimization=<enable, disable, default=enable>, this is an optional flag which may only appear when the -prot flag specifies tcp. It indicates whether TCP connections matching the rule should be bypassed by the TCP optimization (PEP) or whether they should be optimized. This rule doesn't override the overall TCP optimization enable setting (that is, if TCP optimization is disabled overall, having an rule with an enable setting doesn't cause the connection to be disabled. The TCP optimization decision is made during TCP connection establishment based on an evaluation of the TCP connection's first SYN packet. NOTE: This flag may not appear in a rule with a -servermatch flag.

-rtmon=<enable, disable, default=disable>, this is an optional flag which may only appear in a rule that has -servermatch flag and only has affect when the server-category had a match criteria of pageindirect. When this flag appears a, the multiphase classifier performs web-page response time monitoring for a web page whose first URL matches this rule. A rule with an -rtmon flag may also have a -priority flag.

According to various embodiments, the multiphase classifier can be configured to apply various server categorization rules (also acceleration appliance server categorization rule or AASpecificServerCategorizationRule). Exemplary parameters for server categorization rules, according to one specific implementation, can take the form:

AaSpecificServerCategorizationRuleXXXX where XXXX starts at 0001 and counts upwards without gaps. "Specific" in this context is in contrast to "Common" (see the next section) and refers to rules that are site or enterprise specific. Each such parameter provides a category ID and a rule for categorizing the server end of an IP connection as being part of that category. The parameter value format is CSV-ColonKVP, i.e. comma separated fields with each CSV field holding a colon (':') separated Key-Value Pair.

The supported keys are as follows:
categoryid—an alpha-numeric string plus ('_', '-', '$', '.'). Multiple rules may specify the same categoryid allowing multiple sets of servers to be placed into the same category.

matchcriteria—an optional key which takes a string as its value, one of:
"direct"—this is the default match criteria. An IP flow matches when it matches all of the match key defined criteria.
"pageindirect"—used to match IP flows which are estimated as carrying traffic within a page where a flow matched all of the match-key defined criteria. The pageindirect is intended to cause advertisements and other content which is part of a web page to be classified along with the rest of the web page.

The remaining keys are all "match keys" which define a criteria that a flow must match to be considered direct match for this category.

locationmatch—takes a string value, one of: (up, down, either) where the default (when this key is not present) is "up". This key indicates whether the server is located upstream (at the data center or in the public Internet) or downstream (on a branch-office LAN) from the AA. This flag is optional and can appear in conjunction with any other valid combination of "match keys".

domainmatch—where the value is formatted either as:
An exact complete domain match, e.g. "www.walmart.com".
A wildcard tail match, e.g. "*.walmart.com", where the value begins with "*.". NOTE: "walmart.com" is counted as a match for "*.walmart.com".
A wildcard front match, e.g. "walmart.*" where the value ends with ".*". NOTE: "walmart" is counted as a match for "walmart.*".
A wildcard field match, e.g. "*.walmart.*, where the value:
begins with "*.",
ends with ".*" and
has no other no dot ('.') characters.

urlfragmentmatch—where the value is a fragment of a URL where ":" is used to represent a colon (':') and where a "," is used to represent a comma (','). This is used to help identify Netflix video content. NOTE: This match key is intended to be used only for very special cases, such as for the purpose of identifying Netflix Video servers.

missingornumerichttphostmatch—where the value is "1" and where a match occurs only when the IP flow (or the matching flow in the opposite direction) carried an HTTP request and that request either had no "host:" field or had a dot-notation IP address "host: field. NOTE: This match key is intended to be used only for very special cases, such as for the purpose of identifying Netflix Video servers. NOTE: This key is optional, but may only appear with a urlfragmentmatch flag.

NOTE: A valid rule has either a domainmatch key or a urlfragementmatch key (but not both).

According to various embodiments, the multiphase classifier 220 classifies upstream and downstream IP flows in three stages, namely preliminary, initial, and dynamic. The preliminary classification is performed when the first packet of an IP flow is processed. The preliminary classification is based upon the first packet's protocol, addresses, ports, or packet size, together with configured classification override rules. Depending on the specific implementation, the preliminary classification can also be based on any combination of the foregoing parameters from the first packet, or all of the parameters.

The initial classification is performed when as much is known about the IP flow as can be known from its (and its paired reverse direction IP flow's) initial few packets. This specifically includes situations where the domain name of the server has been determined. The manner in which the initial classification can vary depending on whether the IP flow is an HTTP request flow, HTTP response flow, HTTPS request flow, HTTPS response flow, or "other."

For an HTTP request flow, the initial classification is performed when the HTTP request header has been processed (or when it has been determined that the header will not be able to be processed). A persistent HTTP request flow is given an Initial classification for each HTTP request header processed. For an HTTP response flow, the initial classification takes place when the HTTP response header has been processed (or when it has been determined that the header will not be able to be processed). A persistent HTTP response flow is given an Initial classification for each HTTP response header processed.

Initial classification for an HTTPS request flow is performed when the client-hello packet has been processed (or when it has been determined that the client-hello packet will not be able to be processed). In the case of an HTTPS response flow, the initial classification is performed when the paired reverse IP flow has processed the client-hello packet (or when it has determined that the client-hello packet will not be able to be processed). Initial classification for "other" flows can be performed immediately following the preliminary classification. According to at least one embodiment, this classification is based on the domain name of the server found during a reverse domain-name cache lookup. Certain aspects for initial classification depend on the availability of the server domain or domain. According to at least one embodiment, such aspects of the initial classification can take place (even for HTTP and HTTPS flows) as soon as the server domain or domain name has been obtained. This can also occur when an IP flow's first packet is processed, and a reverse domain name cache lookup succeeds and provides one or more domain names.

According to one or more embodiments, classification statistics for servers whose IP flows are classified as real-time or bulk, and for servers whose IP flows are initially classified as light-interactive and subsequently demoted can be maintained in in a cache referred to as an Early Classification Cache, which maintains per-server statistics for the flows coming from or going into a server. The AA 240 maintains an upstream Early Classification Cache, as it is responsible for the classification of upstream flows. Similarly, the IPGW 250 maintains a downstream Early Classification Cache, as it is responsible for the classification of downstream flows.

Various embodiments allow the Early Classification Cache to be keyed by network identifier index (where a network identifier index identifies a network whose domain name space is to be kept separate from the domain name space of other networks) and either domain name and server port number or by server domain (e.g., google.com rather than www.google.com) and server port number. The Early Classification Cache, according to certain embodiments, can have a configurable limitation on the number of ports a given server may maintain. Furthermore, cache entries can be recycled in an LRU fashion. Entries in the Early Classification Cache, as well as its statistics, can be created and/or updated whenever an early relevant classification event occurs. According to at least one embodiment relevant classification events can include, but are not limited to, the following:

An IP-Flow being classified as real-time, light-interactive real-time candidate, light-interactive or bulk.
An IP-flow ending (either by timeout or TCP reset/fin) or reaching the end of a 10-minute segment.
A cache entry is created if one does not already exist and the flow was ever classified as real-time, light-interactive real-time candidate, light-interactive or bulk.
A cache entry is updated when a matching flow's classification is dynamically updated after initial classification, regardless of whether the flow was classified as one of the early-classifications or not.

The Early Classification Cache can be configured to follow an LRU policy. Periodically, the least-recently used entries are checked against an expiration timeout (default 24 hours) and are finalized and deleted. LRU entries are also recycled as needed when a configurable maximum number of unexpired entries are in use. According to one or more embodiments each entry in the early classification maintains the following statistics:

% Real-Time Flow Ema—holds an exponential moving average of the percentage of flows which were promoted to Real-Time.

% Light-Interactive Demotion Ema—holds an exponential moving average of the percentage of flows initially classified as light-interactive that were subsequently demotes.

% Bulk Gold Demotion Ema—holds an exponential moving average of the percentage of flows that were at any time demoted to bulk-gold.

% Bulk Silver Demotion Ema—holds an exponential moving average of the percentage of flows that were at any time demoted to bulk-silver.

According to an embodiment, the duration of the EMA (Exponential Moving Average) is 32 with the value being initialized to the value of the first IP flow. A pair of cache lookups (domain name and domain) occurs when an IP flow's server is first available. When a percentage exceeds a configurable threshold value, the IP flow is immediately re-classified to that level (provided that no override rule overrides the classification). When multiple thresholds are exceeded, the IP flow is immediately reclassified to the lowest such classification level.

Dynamic classification takes place when the traffic characteristics of the IP flow (mainly packet size distribution and bit rate) indicate that the IP flow could be better handled at a different classification level. According to at least one embodiment, dynamic reclassification of the flow can be disabled by the preliminary or initial classification of an IP flow. This can happen, for example, when the IP flow matches a classification override rule that specifies its classification.

Figure 3:
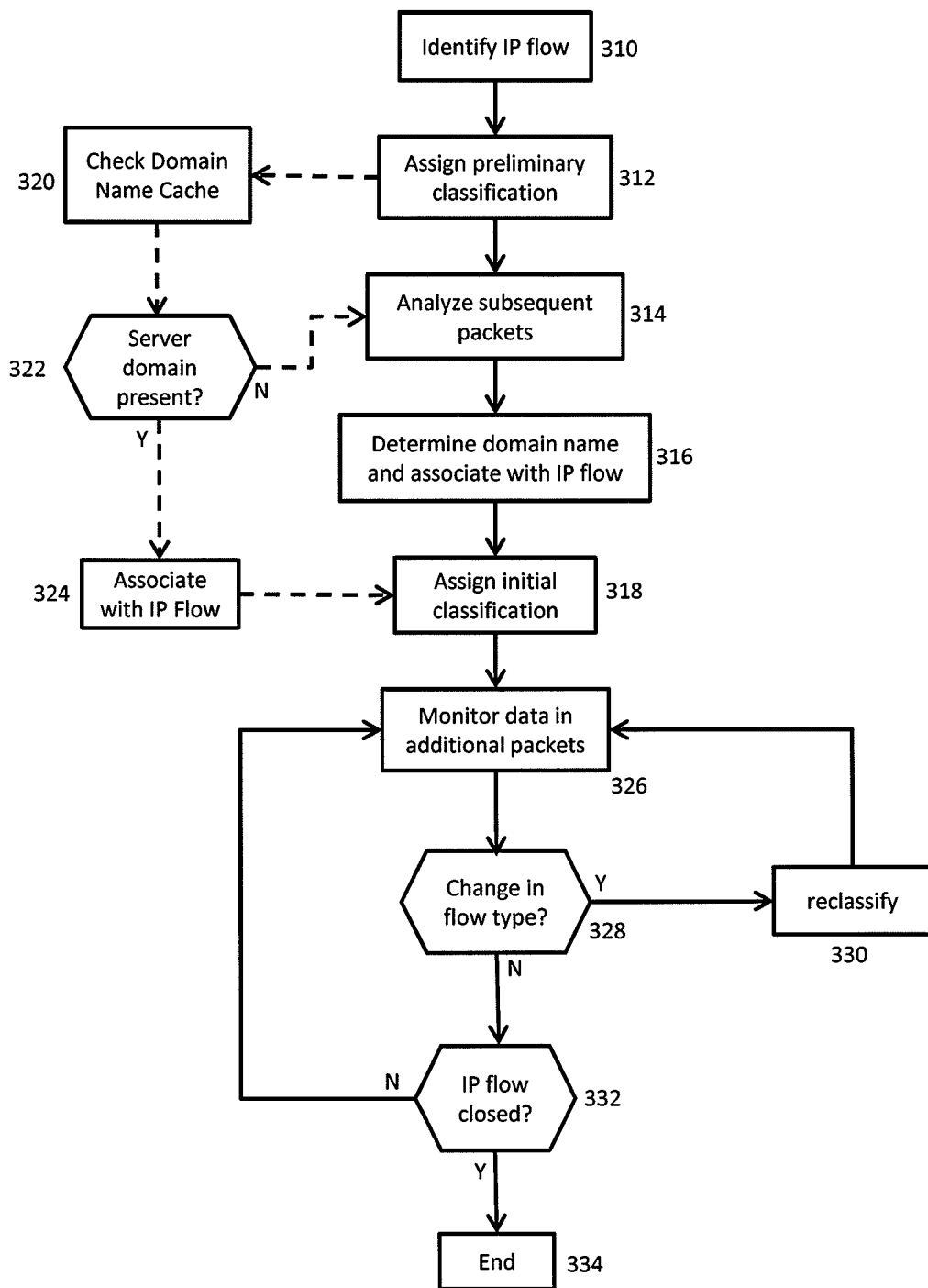
FIG. 3 is a flowchart illustrating a process for classifying traffic data based on IP flow, according to one embodiment.

FIG. 3 is a flowchart illustrating classification of IP flows, in accordance with at least one embodiment. At 310, traffic flow across the communication network is monitored in order to identify the presence of a new IP flow. As previously discussed, a new flow can be identified by examining the transport end points (usually source and destination IP address and ports) and having an IP Flow cache lookup for that transport end-point combination fail. When a new IP flow is identified, an IP flow classifier object is created and stored in the IP Flow cache Once a new IP flow has been identified from the traffic data, a preliminary classification is assigned at 312. According to at least one embodiment, the preliminary classification can be assigned based on protocol information that is contained in the first packet of the IP flow. As previously discussed, the database can store a classification cache which contains various classification categories based on the particular protocol of the IP flow.

At 314, subsequent packets within the IP flow are analyzed. Such an analysis can correspond, for example, to a deep packet inspection which allows various contents of the packet to be examined. At 316, the results of the analysis are examined in order to determine a domain name that is associated with the server end of the IP flow. As previously discussed, the domain name can be obtained from the various portions of the packets, including, for example, the HTTP request header's hostname field. Once the domain name of the server is identified, an association is made between the domain name and the IP flow. Thus, a particular IP flow can be associated with a domain name such as "Google.com", "Netflix.com", or "Yahoo.com".

The TCP sequence numbers of a TCP flow are monitored to ensure that the subsequent packets of the IP flow (and the deep inspection of the flow's data) are correctly analyzed. The sequence number of the flow's TCP SYN packet is recorded and then subsequent packets (with their own TCP sequence numbers) are saved until enough data is retained to properly assemble the data of interest. For HTTP TCP IP flows, the data of interest is the first HTTP request or response header. The end of such a header is identified by the character sequence "CR LF CR LF". For an HTTPS TCP IP flow, part of the data of interest is the first client-to-server data packet which holds the TLS ClientHello message. The first client-to-server data packet is the data packet whose send sequence number matches the HTTPS IP Flow's TCP SYN packet.

At 318, an initial classification is assigned to the IP flow. According to at least one embodiment, the initial classification can be assigned based on one or more classification rules that are associated with the server's domain name, or other information obtained through analysis of the subsequent packets. In at least one embodiment, the other information includes:

HTTP request header Content-Length field, where large values can be used to assign a BULK classification to the flow;

HTTP request header Content-Type field, where selected content types (e.g. video content-types) can be mapped to classifications;

HTTP request URL, where specific substrings in the URL can be mapped to associated classifications;

HTTP request Referrer field;

HTTP response Content-Length field, where large values can be used to assign a BULK classification to the flow;

HTTP response Content-Type field, where selected content types (e.g. video content-types) can be mapped to classifications; and HTTP response Status Code field.

In at least one embodiment, the associated server domains and domain names together with the server port number can be used to perform an Early Classification Cache lookup. Thus, an initial classification can take place when the statistics associated with similar prior IP flows indicate that the current IP flow should be assigned the same classification as those prior IP flows. Once the initial classification is made, all subsequent packets associated with the IP flow are assigned the same classification by the multiphase classifier, at least until the multiphase classifier makes a subsequent dynamic reclassification. In at least one embodiment this subsequent dynamic reclassification can be based on the size and frequency of the IP flow's subsequent packets.

According to one or more embodiments, the Domain Name Cache can be used to quickly provide an initial classification to the IP flow immediately after assignment of the preliminary classification without processing any additional packets. For example, the server IP address can be used to perform a reverse DNS lookup in the Domain Name Cache at 320. At 322, it is determined whether one more matching server domains (and/or domain name) are present in the Domain Name Cache. Those that match are associated with the IP flow at 324. Control would then pass to 318, where the initial classification is assigned. According to such embodiments, the initial classification can be assigned without the need to analyze subsequent packets. If it is determined, at 322, that no matching server domains (and/or domain names) are present in the Domain Name Cache, then control passes to 314.

As communication proceeds, data in subsequent packets is continually monitored, as indicated at 326. According to an embodiment, the data is monitored in order to determine whether any changes have occurred since the initial classification was assigned. In at least one embodiment the changes being monitored include the size and frequency of the IP Flow's packets. At 328, it is determined whether changes have been detected which would require the IP flow to be assigned a new classification. If changes have occurred, the IP flow is reclassified at 330, and the Early Classification Cache is updated with the particulars of the IP flow (associated server domains, domain names and the server port) and the classification history of the flow including the classification before and after reclassification (i.e., at 330).

According to at least one embodiment, the IP flow is reclassified by applying one or more classification rules based on the information obtained from monitoring the additional packets. Once the IP flow has been reclassified, the IP flow's current and subsequent packets are assigned the new classification. As illustrated in FIG. 3, control then returns to 326 where data from additional packets in the IP flow are monitored. Alternatively, if no changes have occurred, then it is determined whether or not the IP flow has been closed at 330. According to at least one embodiment, such information can be obtained by accessing various fields contained in the additional packets at 326. If the IP flow has not been closed, then control returns to 326 where data from subsequent packets continues to be monitored.

According to one or more embodiments, upon detecting a change in the flow type at 328, control can pass to 332 in order to determine whether or not the IP flow has been closed. In at least one embodiment, an IP flow is determined to be closed when a long enough period of time has elapsed with no further packets. In at least one embodiment, the detection of end-of-TCP connection related packets (e.g. TCP FIN, TCP FINAK or TCP RST) packets shorted the required time with no further packets. Reclassification would then take place only in the case where the IP flow has not been closed by the last packet monitored. If the IP flow is determined to be closed, then the process ends at 334.

As previously discussed, the multiphase classifier performs classification in three stages. According to various embodiments, the initial stage is performed differently depending on the particular type of flow detected. When an HTTP request flow is detected, subsequent (i.e., additional) packets are processed by the multiphase classifier in order to decode the HTTP request header and record the URL, host, referrer, content-type, content-length, and user-agent fields. Using this content, the AA upstream multiphase classifier performs a database lookup and update and, together with the classifier override rules. Based on the results, the AA upstream multiphase classifier adjusts the IP flow's preliminary classification with an initial classification. The AA upstream multiphase classifier forwards the HTTP request packet data upstream. Next, the IPGW upstream multiphase classifier decodes the HTTP request header and records the URL, host, referrer, content-type, content-length, and user-agent fields. The IPGW upstream multiphase classifier uses this information to perform a database update.

The IPGW downstream multiphase classifier receives and decodes the HTTP response header in order to retrieve the content-type and content-length fields. The IPGW downstream multiphase classifier then looks up the corresponding flow in the IPGW upstream multiphase classifier and does database lookup and update. The IPGW upstream multiphase classifier also looks up the classification override rules, and revises the preliminary classification with an initial classification. The packets are continually monitored, and reclassified if it is determined that another classification would be better suited for the IP flow. In conditions where HTTP persistent connections are supported, the process is repeated for each subsequent HTTP transaction. The beginning of a subsequent HTTP transaction is identified by the presence of an upstream TCP data packet following the reception of at least one downstream TCP data packet.

According to an embodiment, when an HTTPS upstream IP flow is detected, the AA upstream multiphase classifier decodes the SSL/TLS ClientHello packet and extracts the server name from the Server Name Indication (SNI) field. The SNI is an extension of the TLS networking protocol by which a client can indicate which hostname it is attempting to connection to at the start of the handshaking process. Although it is an extension to the TLS protocol, it is commonly employed by many web browsers. The AA upstream multiphase classifier also computes a ClientHello hash which is based on the non-changing parts of the client-hello. The AA upstream multiphase classifier uses this information to perform database lookup and update. A lookup of the classifier override rules is also performed, and the AA upstream multiphase classifier adjusts the IP flow's classification with an initial classification. According to an embodiment, a lookup in the Early Classification Cache for the IP flow (its server port and associated server domain and domain name) can also performed, and this may also result in an initial classification of the IP flow.

Next, the IPGW upstream multiphase classifier decodes the SSL/TLS ClientHello packet and extracts the server name field in the same way. The IPGW upstream multiphase classifier also computes a ClientHello hash which is based on the non-changing parts of the client-hello, in the same manner as the AA. The IPGW upstream multiphase classifier then does a domain name cache update using the server domain name and server IP address. Upon receiving the first downstream TCP data packet, the IPGW downstream multiphase classifier looks up the corresponding flow in the IPGW upstream multiphase classifier. The IPGW downstream multiphase classifier further performs a database lookup and update for the domain name cache and, together with the classification override rules, revises the downstream IP flow's preliminary classification with an initial classification. The packets are continually monitored, and reclassified if it is determined that another classification would be better suited for the IP flow. A lookup in the Early Classification Cache for the flow (its server port and associated server domain and domain name) is also performed and this may also result in an initial classification of the IP flow.

Figure 4:
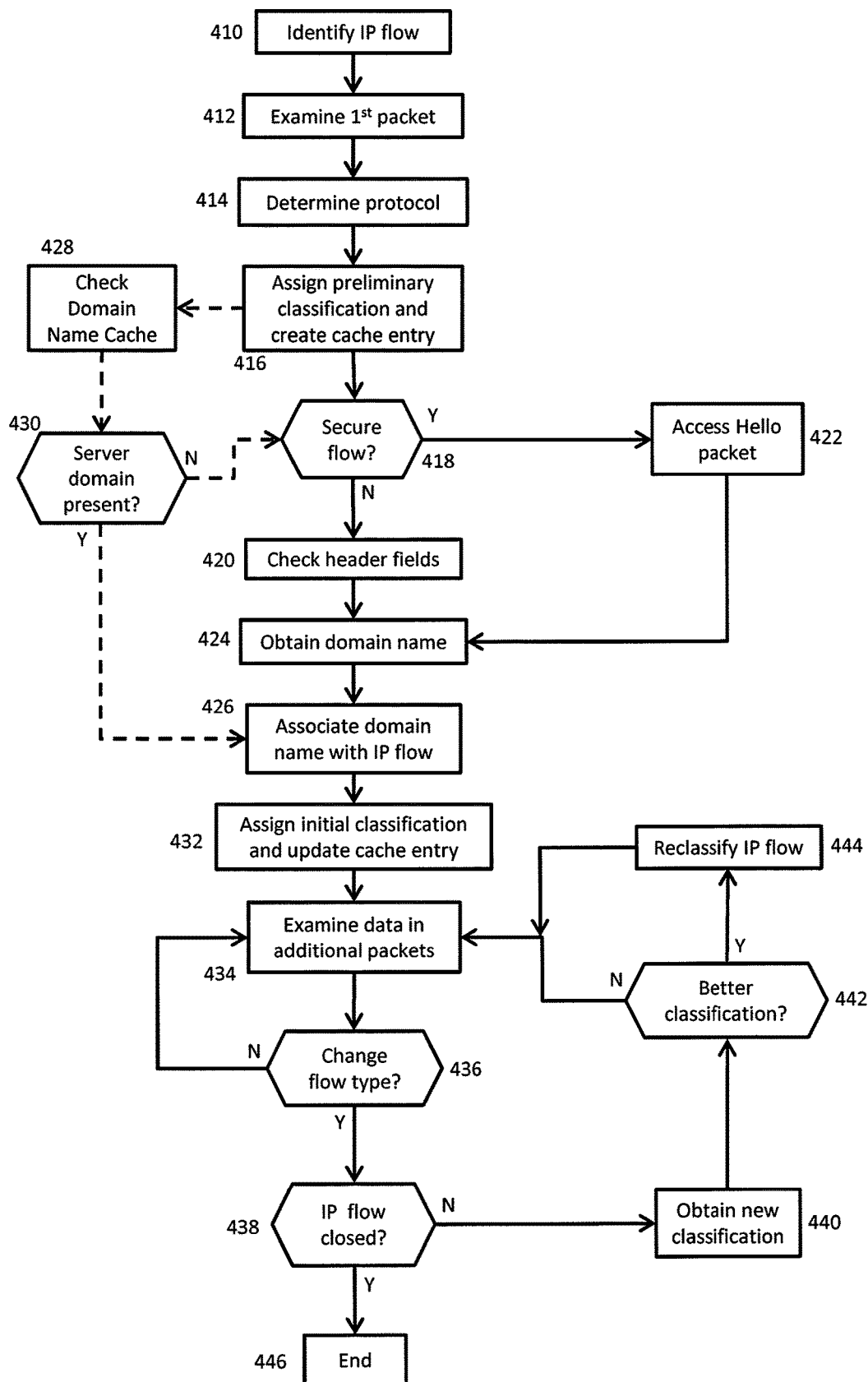
FIG. 4 is a flowchart illustrating a process for classifying traffic data based on IP flow, according to a further embodiment.

FIG. 4 is a flowchart illustrating the steps performed in classifying IP flows, in accordance with one or more embodiments. At 410, traffic data in the communication network is monitored in order to identify a new IP flow. At 412, the first packet in the IP flow is examined. At 414, the protocol being used is determined through analysis of the first packet. At 416, a preliminary classification is assigned to the IP flow based on the determined protocol and one or more classification override rules. According to at least one embodiment, the first packet can be further examined in order to determine additional information such as IP address, port number, size, etc. This information can further be used in assigning the preliminary classification. More particularly, the preliminary classification can be assigned based on the protocol alone or in combination with any of the foregoing information that can be determined from the first packet.

An entry is also created for the IP flow at 416, once the preliminary classification has been assigned. According to at least one embodiment, a cache (or flow cache) can be created to maintain information pertaining to all open (or active) IP flows. According to one or more embodiments, the cache (or IP flow cache) can be configured as part of the database. Once an initial IP flow is identified, an entry is created in the cache for monitoring and maintaining its status. At 420, it is determined whether the IP flow is a secure flow (e.g., SSL/TLS). If the IP flow is not secure, (but rather an HTTP flow), then various fields within the request header are examined at 422. Depending on the direction of the IP flow fields can be examined within either the request header or the response header. For example, the host field in the request header can be examined in order to identify the appropriate domain name. This is indicated at 426.

If the IP flow is determined to be a secure flow, however, then control passes to 424. According to at least one embodiment, the TLS handshake associated with the secure request is examined in order to access a ClientHello packet. Once the ClientHello packet has been accessed, the domain name of the responding server can be obtained, at 426, from the Server Name Indication (SNI) extension field. At 428, the domain name is associated with the IP flow.

According to one or more embodiments, entries in the Domain Name Cache can optionally be checked at 430, without having to distinguish a secure IP flow or examining header fields in the (nonsecure) IP flow. At 432, it is determined whether or not any server domains (and/or domain names) are present in the Domain Name Cache. If any matching server domains and/or domain names are present, then control passes to 428, where the matching server domains and/or domain names are associated with the IP flow. If it is determined, at 432, that no server domains and/or domain names are present in the Domain Name Cache, then control passes to 420.

At 436, an initial classification is assigned to the IP flow. As previously discussed, the initial classification is made by applying one or more classification rules pertaining to the types of flows that are associated with the particular domain name or by Early Classification Cache lookup. The IP flow cache is also accessed at 436 in order to update the entry that was previously created for the IP flow. For example, the entry created for the IP flow at 418 is made based on preliminary factors obtained from the first packet. At that point, no examination had been done to determine the domain associated with the IP flow. Thus, once this information is obtained, the entry is updated to reflect the domain name of the server associated with the IP flow.

At 438, data in additional packets of the IP flow is examined. At 440, it is determined whether a change has occurred in the IP flow. As previously discussed, this is done based on examination of the additional packets. If no changes have occurred, then control returns to 438, where additional packets are examined. If changes have been determined, then control passes the 442 where it is further determined whether the IP flow has been closed. If the IP flow has not been closed, then a new classification is applied based on information learned through examination of the additional data packets. This is done at 444. According to an embodiment, the classification is determined based on information obtained by monitoring the additional packets and application of one or more classification rules.

At 446 it is determined whether the new classification is a better classification for the IP flow. For example, according to at least one embodiment, the classification is considered to be better if it results in a higher priority classification than the initial classification assigned to the IP flow (at 436). According to another embodiment, the new classification can be considered better if it more accurately represents the IP flow than the initial classification. Furthermore, the new classification can result in a higher priority classification and also represent the IP flow more accurately than the initial classification. If the new classification is better than the initial classification, the IP flow is reclassified at 448. Control then returns to 438 where additional packets are examined. According to one or more embodiments, rather than determining whether the new classification is better than the initial classification, a test can simply be performed to determine whether the new classification differs from the initial classification. Thus, the IP flow would be reclassified regardless of whether the new classification results in a higher priority or a lower priority than the initial classification. If the IP flow is determined to be closed at 442, then no reclassification is performed. Rather, the process ends at 450.

According to an embodiment, the multiphase classifier can perform in-page processing for classifying all the IP flows within a web page. In-page processing can support two important end-user services. First, in-page processing can support easy classification of complete web pages (both HTTP and HTTPS) based on the domain-name of the server from which the page is retrieved. Modern web pages can be composed of dozens or hundreds of individual HTTP retrieved elements (aka URLs) coming from a variety of servers from a variety of domains (e.g., ad lookup servers, ad content-servers, content-delivery servers as well as the web server that is the source of the HTML framing the whole page). The ability to classify an entire page even when it comes from a variety of servers can oftentimes be a valuable capability. Second, in-page processing can support response-time monitoring of web pages (both HTTP and HTTPS) from a configurable category of servers. Thus, in-page processing can work with both HTTP and HTTPS transactions. According to various embodiments, in-page processing need only be done in the downstream direction for purposes of maintaining QoS classification, or may occur in both the upstream and downstream directions.

For the purposes of web-page response time monitoring, various embodiments perform in-page processing within the AA for several reasons, including the following:

The start of a web page is best identified by the AA (as it sees the start of the HTTP request closer to the actual start of the web page than the IPGW).

Web page response time monitoring is most of interest totaled up on a per-site basis (as a way of identifying problematic sites).

As can be appreciated, conventional HTTP and HTTPS operate in a pure transaction mode where a transaction consists of (1) a burst of request TCP data packets and (2) a burst of response TCP data packets. According to an embodiment, the multiphase classifier includes a transaction object for each pair of HTTP IP flows and for each pair HTTPS IP flows. This object maintains a state machine to monitor that pair of IP flow's transaction state. The states are:

Requesting—when the previous data packet was a client to server packet.

Actively Responding—when the previous data packet was a server to client packet and was received recently.

Inactively Responding—when the previous data packet was a server to client packet, but more than a configurable timeout (default=1000 ms) has elapsed since the previous data packet.

According to an embodiment, the multiphase classifier maintains a second state machine (in-page transaction state machine) to monitor the status of each active HTTP or HTTPS transaction that is involved with in-page processing. The states are:

Open—The in-page transaction state machine enters the transaction into this state when the transaction is first categorized as in-page (that is, estimated as part of a web page that is subject to in-page processing). When processing a packet for an open in-page transaction, the in-page transaction state machine reports the transaction's total number of bytes processed and the current timestamp to the InPageCache when it has been at least a configurable period of time (SCInPageReportingMs, default=500) since the previous report. The InPage-Cache uses this report to update the page's recent activity timestamp which is used, for new HTTPS transactions, to determine time proximity (TimeProximity) of in-page transactions, and to help identify when to close the page as a whole.

Closed—when the transaction has moved to the Inactively Responding state or when a new transaction starts on the connection or when the connection starts to shutdown as evidenced by the processing of an RST, FIN or FINACK TCP packet.

Ejected—when the transaction's size exceeds a configurable threshold (default=300000) for a web page component. When a transaction is ejected its in-page processing completes and the transaction is no longer categorized as in-page.

According to an embodiment, a page cache can be created to store and maintain the status of all open web pages. Information stored in the page cache can be used, at least in part, for assisting the in-page processing. According to at least one specific embodiment, the page cache (also referred to as InPageCache) object can be configured as a data structure that stores the information needed to perform the in-page classification of HTTP and HTTPs flows. Information related to web-page retrievals is only stored in the page cache if:

the first transaction (HTTP or HTTPS) in the page matches a classification rule that utilizes a -servermatch flag, the matching server category has pageindirect match criteria and the classification rule has either an -priority action and/or a -rtmon action.

According to at least one embodiment, all of the entries in the cache are keyed by a 64-bit hash where:

Bits 48 . . . 63 contain a network identifier. This part of the key ensures that security is maintained in terms of keeping information from one acceleration tunnel completely separate from the information from other acceleration tunnels. The field is large enough to allow the IPGW to have a unique tunnel index for each acceleration tunnel of each AA registered with the IPGW.

Bits 0 . . . 47 contain a hash where the hash is based on fields that vary with the kind of information the entry contains and/or by the kind of entry.

The InPageCache stores the following kinds of entries:

HttpBrowser—the page cache has one of these entries for each identified non-secure browser that has recently made an HTTP request which was categorized for in-page processing. The entry is keyed by the network identifier and the browser ID. According to at least one embodiment, the HTTP BrowserID can be a 48-bit hash of the browser IP together with the browser User-Agent field. For response time measurement purposes, the HttpBrowser entry determines whether the browser has a measurable page retrieval underway and maintains stats for the page retrieval. According to an embodiment, a given browser can have, at most, one measurable page retrieval underway.

HttpPageStart—the page cache has one of these entries for each open, non-secure web page retrieval where the entry covers the HTTP transaction which the multiphase classifier has estimated as carrying the first URL in the open, non-secure web page retrieval. The entry is keyed by the network identifier, the browser ID, and the HTTP transaction's absolute URL. The HttpPageStart entry is the root of a tree structure of InPageCache entries. The tree structure has a node for each HTTP transaction that is considered to be part of the root's web page. A given HTTP transaction's referrer field and browser ID provides the means for a new HTTP transaction to considered in-page and linked into the page's tree structure.

HttpInPage—the page cache has one of these entries for each open transaction which the multiphase classifier has estimated as being part of a non-secure web page whose first URL already has a HttpPageStart entry in the page cache. The entry exists to allow HTTP transactions to be determined as in-page when their referrer field refers to an in-page HTTP transaction other than the HttpPageStart transaction. The entry is keyed by the network identifier, the browser ID and the HTTP transaction's absolute URL.

HttpsBrowser—the page cache has one of these entries for each identified secure browser that has recently made an HTTPS request which was categorized for in-page processing. The entry is keyed by the network identifier and the browser ID. For response-time measurement purposes, the HttpsBrowser entry determines whether the browser has a measurable page retrieval underway and maintains stats for the page retrieval. According to an embodiment, a given browser can have, at most, one measurable page retrieval underway.

HttpsIndirectDomain—the page cache has one of these entries for each HTTPS domain (e.g. .google.com) that has recently (or is currently involved in) an HTTPS transaction to a server that was categorized with a page-indirect match criteria. The entry is keyed by network identifier, browser ID and server domain.

According to one or more embodiments, the InPageCache object can be implemented using a least recently used (LRU) policy. Ordinarily entries are deleted from the page cache when an entry is closed or ejected and this happens prior to a CacheExp object expiring the entry. An InPageCacheEntry object is able to support any of the kinds of entries held by the InPageCache.

According to various embodiments, the multiphase classifier maintains an object responsible for classifying an HTTP IP flow and its HTTP transactions, referred to as the IP flow object. With the help of the multiphase classifier, the IP flow object determines whether the IP flow is an HTTP response flow that might be the start of HTTP web page. This determination takes place as part of the initial classification of the flow. When the IP flow might be the start of an HTTP web page, the object interacts with the InPageCache and creates or updates the HttpBrowser entry for the IP flow's browser. The IP flow object then creates or updates the HttpPageStart entry for the HTTP transaction. Alternatively, when the HTTP transaction may not be the start of an HTTP web page, the HTTP IP flow object interacts with the page cache and determines whether the HTTP transaction's referrer field matches an open HttpPageStart entry or an open HttpInPage entry.

According to an embodiment, an HTTP response (header and body) might be the start of a web page when two conditions are met. First, the HTTP response status code must be 200. Second, the content-type must be some form of text/html. An HTTP response (header and body) can be confirmed as the start of a web page when the response body length is determined to exceed a configurable value (default=10,000), and is less than the ejection size limit. This determination can be made either via the HTTP response header's content-length field or by counting the size of the HTTP response packets. When the content-length field is available the size must also be less than the ejection threshold.

When an HTTP transaction's referrer field matches an open HttpPageStart entry or an open HttpInPage entry, the HTTP transaction is considered to be "in-page". In response, the IP flow object completes the initial classification using both the IP flow's own server category and the server category from the matching InPageCache entry. The IP flow object also creates or updates an HttpInPage entry for the HTTP transaction updating the recently-used status of the matching entry and the chain of entries leading to and including the HttpPageStart entry. If the HTTP transaction is not the start of an HTTP web page and does not match an open entry in the InPageCache, initial classification completes without any in-page processing and no further in-page processing is performed for the transaction.

After the initial classification has been assigned, each IP flow object monitoring an in-page HTTP transaction reports into the InPageCache periodically while the transaction is open and when its transaction closes or is ejected. According to an embodiment such a report can be used to discover if/when the page as whole has been ejected. When it is discovered that the page has been ejected, the transaction itself is also ejected. In order to classify a web page as closed, at least one embodiment allows an HttpPageStart entry to classify its web page as closed when there have been no reports for the page recently (default timeout=5000 ms) and when the HttpPageStart entry's HTTP transaction has closed. The closing or ejection of an HTTP transaction undoes whatever in-page classification or classification change, if any, was performed by the HTTP IP flow object when the IP flow matched an open entry in the InPageCache. Once the web page is closed, response time measurement stats can be logged if the page qualifies for response time measurement logging.

Figure 5:
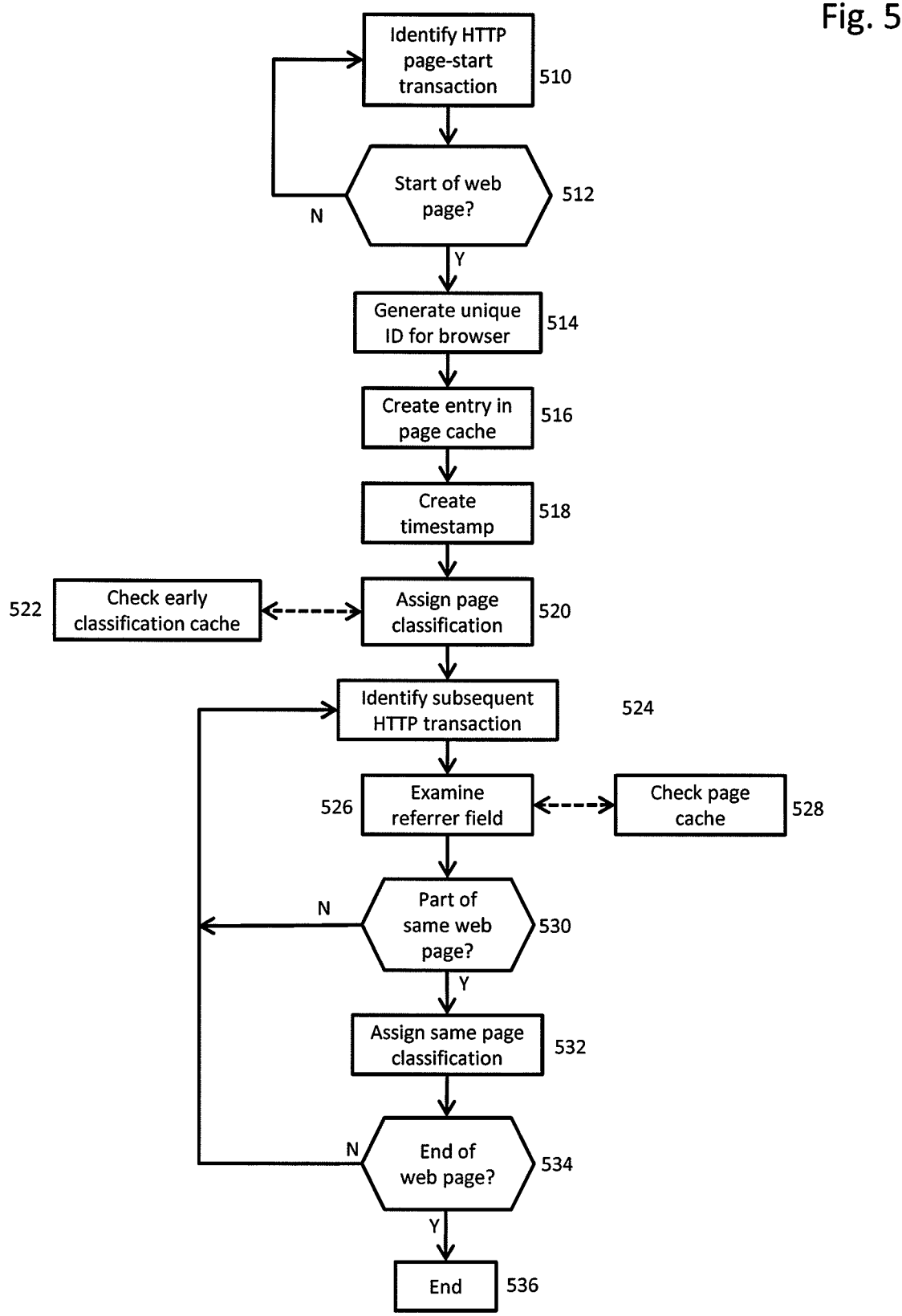
FIG. 5 is a flowchart illustrating a process for classifying traffic data within a web page, according to one or more embodiments.

FIG. 5 is a flowchart illustrating the steps performed in classifying IP flows belonging to the same web page, in accordance with at least one embodiment. At 510, traffic data passing through the communication network is examined in order to identify an HTTP page-start transaction. As previously discussed, an HTTP page-start transaction corresponds to a transaction whose initial packet contains information (e.g., HTTP get request) indicative of a protocol which may result in opening HTML file. At 512, the HTTP page-start transaction is examined in order to determine whether it actually corresponds to the start of a web page. If the HTTP page-start transaction does not correspond to the start of a web page, then control returns to 510, where the traffic data continues to be monitored until an HTTP page-start transaction is identified. If the HTTP page-start transaction corresponds to the start of a web page, then a unique ID is generated for the browser requesting the web page at 514. As previously discussed, the unique ID for the browser can be a 48-bit hash of the browser IP together with the browser User-Agent field.

At 516, an HttpBrowser entry is created, if it does not already exist, in the InPageCache for the browser. According to at least one embodiment, the entry is created, in part, based on the ID that is previously generated for the browser. In addition, an HttpPageStart entry is created in the InPageCache for the HTTP page-start transaction. At 518, a timestamp is created and saved in the page cache as part of the entry for the browser. The timestamp can correspond, for example, to the start of the particular web page. At 520, a classification is assigned to the web page. This classification can be considered a page classification for the particular web page, and would be assigned to all IP flows which form part of the web page. According to at least one embodiment, the classification can be assigned based, in part, on analysis of the IP flows corresponding to the page-start transaction. Accordingly, those IP flows would be analyzed such that a preliminary classification is assigned based on examination of the first packet, and an initial classification is assigned after examination of subsequent packets.

According to further embodiments, however, additional analysis of the first packet can be performed in order to determine the packets IP address, port number, size, etc. Various combinations of such information can then be utilized to classify the initial IP flow. According to still further embodiments, an Early Classification Cache can be created and maintained based on the manner in which flows from certain domain names are typically classified. Alternatively, information regarding the manner in which certain types of protocols are classified can be maintained separately in the Early Classification Cache, or in conjunction with information regarding various domain names. The Early Classification Cache can then be accessed in order to classify the initial IP flow (at step 522).

At 524, monitoring of the traffic data is resumed in order to identify a subsequent HTTP transaction within the traffic data. At 526, the HTTP request header of the subsequent HTTP transaction is examined in order to examine and retrieve the contents of the referrer field. As previously discussed, the referrer field can be used to identify the web page which caused the retrieval of information that would be contained in the subsequent HTTP transaction. Once the content of the referrer field has been retrieved, the page cache is examined, at 528, in order to determine whether any existing entries correspond to the same web page identified in the referrer field. At 530, it is determined whether the subsequent HTTP transaction is part of the same (or classified) web page. According to at least one embodiment, if the information contained in the referrer field matches an open entry in the page cache, the subsequent HTTP transaction is considered to be a part of the same web page whose entry remains open within the page cache.

According to at least one embodiment, if the referrer field does not match an open entry in the page cache, then it is not considered to be a part of a classified web page. Control returns to 524 where subsequent HTTP transactions are identified. According to further embodiments, if the subsequent HTTP transaction is not part of the web page, then its IP flows can be re-examined and classified as an individual IP flows.

If the subsequent HTTP transaction is part of the classified web page, then it is assigned the same page classification that was assigned to the initial HTTP page start classification. This is done at 532. Thus, according to the illustrated embodiment, the subsequent HTTP transaction is only examined to determine whether it is part of the same web page that has been opened. No further analysis is made for purposes of classification. Rather, once a classification has been established for the web page, all subsequent HTTP transaction that are part of the same web page are automatically assigned the same classification. At 534, it is determined whether the end of the web page has been reached. If the end of the web page has not been reached, then control returns to 524 where subsequent HTTP transactions are identified.

According to at least one embodiment, the criteria for identifying the end of the web page can be based, in part, on the amount of time which elapses between receipt of subsequent HTTP transaction packets for the web page. For example, a predetermined threshold can be set as the maximum limit. Thus, entries for the web page within the page cache can be monitored in order to determine if the threshold has been exceeded without further activity (i.e., receipt of subsequent IP flows that are determined to be part of the same web page). At this point, an entry can be made in the page cache to specify that the transaction for a particular web page has closed. When all of a web page's transactions (i.e., start-page transaction and subsequent transactions) have closed, then the web page is considered closed at 536.

When processing HTTPS (secure) web pages, the pair of HTTPS IP flow objects corresponding to the IP flows constituting an HTTPS connection cooperate to track individual HTTPS transactions. With the help of the multiphase classifier, the HTTPS IP flow object determines whether a particular transaction might be the start of HTTPS web page. This is the case when the flow's server category was assigned from a rule with a page-indirect match criteria and the cache does not already have an HttpsIndirectDomain entry whose open page is from the same domain. When the HTTPS transaction might be the start of an HTTPS web page, the HTTPS IP flow object interacts with the InPage cache (i.e., page cache) and creates or updates the HttpsBrowser entry for the IP flow's browser ID. Next, the HTTPS IP flow object creates or updates the HttpsIndirectDomain entry for the server domain registering the entry with the HttpsBrowser entry. If the HTTPS IP flow object determines that the HTTPS transaction may not be the start of an HTTPS web page, the HTTPS IP flow object interacts with the InPage cache (i.e., page cache) and determines whether the flow's BrowserID has one or more open HttpsIndirectDomain entries.

According to at least one embodiment, the HTTPS BrowserID can be a 48-bit hash of the browser IP together with a hash of those parts of the TLS ClientHello message that should be common to all ClientHello messages and yet may vary from one browser to another. According to an embodiment, the following can be used:

CipherSuite length and CipherSuites1 . . . n.
Cmp (compression) length and cmp 1 . . . n.

If the transaction might be the start of an HTTPS web page, it is categorized as either as either in-page or time proximate. In-page corresponds to the condition where the flow's server domain matches that of the domain of an HttpsIndirectDomain entry with an open web page. Time proximate corresponds to all other conditions. For time proximate categorization, the transaction is matched up as related to the least recently opened page of all of the browser's HttpsIndirectDomain entries that have open pages. Otherwise, initial classification completes without any in-page server category matches and without any further in-page processing.

After completing the initial classification, each HTTPS IP flow object monitoring an in-page HTTPS transaction reports into the InPageCache (i.e., page cache) periodically while the transaction is open and when its transaction closes or is ejected. The report updates the related HttpsIndirectDomain entry which may trigger an update to the HttpsBrowser entry. Such a report can result in the discovery that the page as whole has been ejected. When that discovery is made the transaction itself is also ejected. Similarly, a TimeProximate entry also reports periodically and its data usage is recorded as contributing to the HttpsIndirectDomain entry's page size.

According to an embodiment, an HttpsIndirectDomain entry classifies its web page as closed when there have been no recent in-page reports for the page (SCInPagePageCloseTimeout), and when the HttpsIndirectDomain entry's HTTPS transaction has closed. According to another embodiment, reports (or lack thereof) from TimeProximate entries do not affect the determination of when to close the page. The closing or ejection of an HTTPS transaction undoes whatever in-page classification or classification change, if any, that was performed by the HTTPS IP flow object if the IP flow matched an open entry in the page cache. The closing of a page also triggers the logging of response time measurement stats when the page qualifies for logging.

Figure 6:
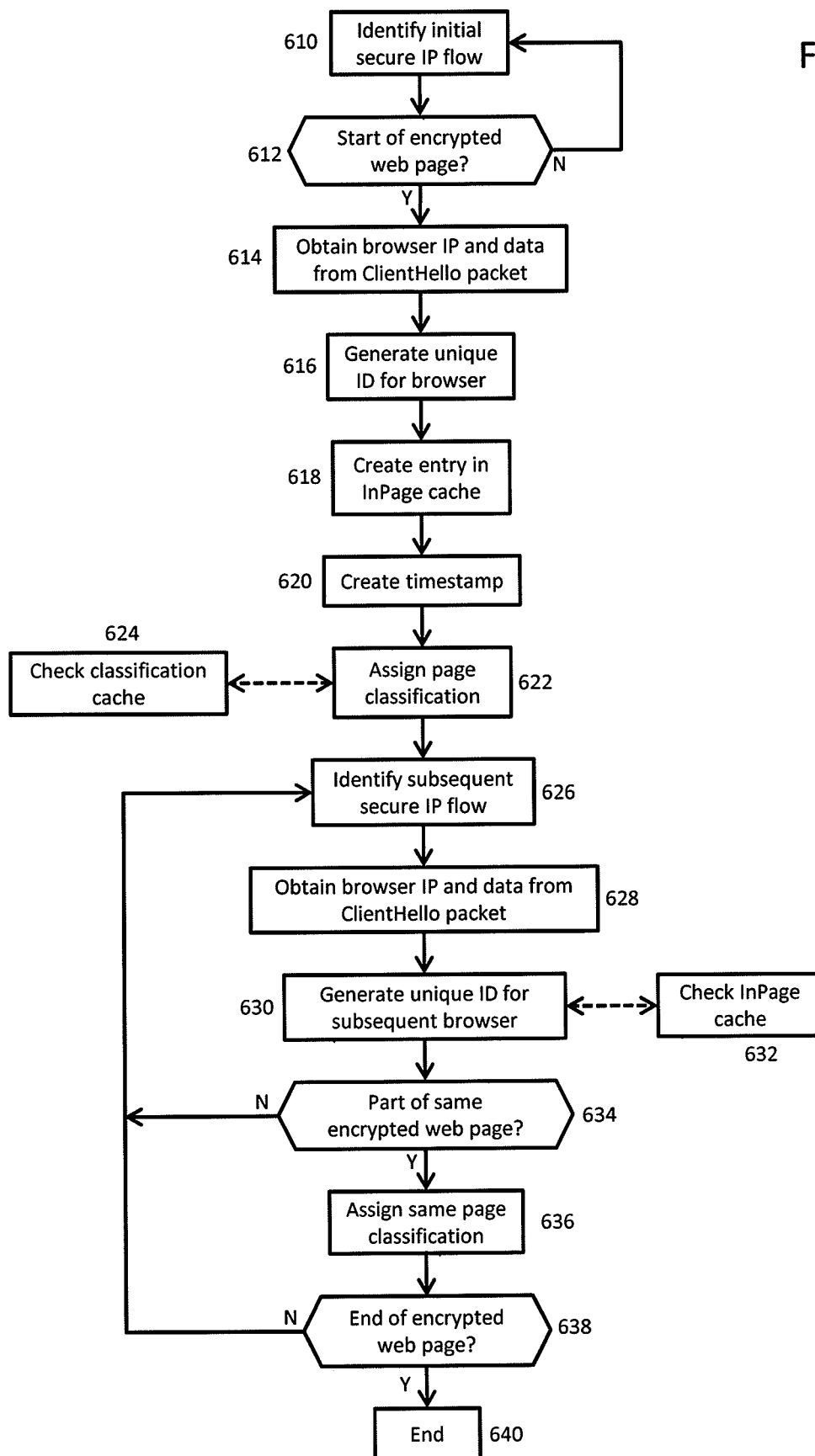
FIG. 6 is a flowchart illustrating a process for classifying traffic data within an encrypted web page, according to an embodiment.

FIG. 6 is a flowchart illustrating classification of IP flows belonging to the same web page during a secure transaction, in accordance with at least one embodiment. At 610, traffic data within a communication network is monitored in order to identify an initial secure IP flow. At 612, it is determined whether the initial secure IP flow corresponds to the start of an encrypted web page. If it does not correspond to the start of an encrypted web page, then control returns to 610 where the traffic data continues to be monitored. If the initial secure IP flow corresponds to the start of an encrypted web page, then control passes to 614. The ClientHello packet contained in the TLS handshake is examined in order to obtain the IP address for the browser requesting the encrypted web page, as well as various other data. As previously discussed, at least one embodiment provides for obtaining data corresponding to information that is not expected to change for the particular browser (i.e., static fields).

At 616, a unique ID is generated for the browser. As previously discussed, the IP flow has been determined to be secure. The contents of the web page, are therefore encrypted and cannot be accessed. Thus, fields within the packet headers which can normally identify the browser are not accessible. According to at least one embodiment, the ID is generated based on a hash of the browser's IP address and the contents of at least one of the static fields within the ClientHello packet. At 618, an httpsIndirectDomain entry is created in the InPageCache for the web page. A timestamp is also created, at 620, to specify the time at which the entry is created in the InPageCache. Thus, the timestamp also designates the start of the encrypted web page. At 622, a page classification is assigned to the initial secure IP flow. As previously discussed, the page classification corresponds to the initial classification for the initial secure IP flow, and used for all secure IP flows associated with the web page.

As illustrated in FIG. 6, the classification cache can be examined, at 624, so that one or more classification override rules can be applied in order to classify the initial secure IP flow. At 626, the traffic data continues to be examined in order to identify any subsequent secure IP flows. At 628, the TLS handshake is examined in order to access the ClientHello packet. The browser IP address and various other data is also obtained from the ClientHello packet at 628. At 630, a unique ID is generated for the browser associated with the subsequent secure IP flow (i.e. the subsequent browser). The unique ID is generated using the same fields within the hello packet for all secure IP flows. The browser ID for the subsequent secure IP flow is then checked against the page cache, at 632, in order to see if it matches any open entries.

At 634, it is determined whether the subsequent secure IP flow is part of the same encrypted web page. As previously discussed, this determination would be true, if the browser ID generated for the subsequent secure IP flow matches an open web page entry in the page cache. If it is not part of the same encrypted web page, then control passes to 626 were subsequent secure IP flows are identified. If the subsequent secure IP flow is part of the same encrypted web page, then it is assigned the same page classification at 636. At 638, it is determined whether the end of the encrypted web page has been reached. If the and has not been reached, then control returns to 626 where additional subsequent secure IP flows are identified. According to at least one embodiment, the end of the encrypted web page is reached when the elapsed time between subsequent secure IP flows for the encrypted web page exceeds a predetermined threshold. Furthermore, a page entry must be made for the encrypted web page specifying that the transaction for the encrypted web page has been closed. The process would then and at 640.

According to at least one embodiment, the multiphase classifier can be used to determine and/or monitor response time for the web page. For example, the multiphase classifier 220 (or the downstream multiphase classifier 220b) can receive the BrowserID and start of transaction timestamp from the paired upstream multiphase classifier entry. When an HttpPageStart entry for the transaction is created, that timestamp is considered the start of the Web Page retrieval. When the HttpPageStart entry is created, its key and timestamp are passed to the HttpBrowser entry which records the key and the timestamp provided conditions permit the web page to be considered a measurable web page. As previously discussed, a minimum period of time (configurable, SCMeasurableHttpWebPagePrepagePauseMs, default=2000) must have elapsed since any other HTTP in-page transactions for the Browser and since the prior measurable HTTP web page was closed, in order for the web page to be considered a measurable web page The end of a web page is identified by the arrival time of the last "big" packet (compile-time constant, default=800 bytes) packet on any of the flows which are in-page for the web page in question. The multiphase classifier IP flow object managing the HTTP response part of a transaction records the time of each "big HTTP response packet" as it processes the packet and reports that timestamp (and the response size in bytes) to the InPageCache either when it does its periodic reporting while open, or when it closes the transaction. When a measurable web page's HttpPageStart entry's HTTP transaction closes along with experiencing an absence of reports from in-page transactions, the web page as a whole is closed and its characteristics are evaluated (number of URLs and number of bytes) and if they qualify the web page's response time and related stats are logged in the appropriate log files.

According to one or more embodiments, the HttpsBrowser entry maintains the set of unclosed HttpsIndirectDomain cache entries. An HttpsIndirectDomain cache entry object maintains a recent activity timestamp. An HTTPS transaction is only a candidate to be related to a page as a TimeProximate when the web page's activity timestamp is within a configurable time (default=1100 ms) of the HTTPS transaction's start time. When measuring the HTTPS web page response time, the multiphase classifier 220 (or downstream multiphase classifier 220b) entry is responsible for interacting with the InPage cache. It receives the BrowserID, start of transaction timestamp, server domain, and server domain name from the paired upstream multiphase classifier IP flow object. When an HttpsIndirectDomain entry for the transaction is created, the start of transaction timestamp is considered to be the start of the web page retrieval.

When the HttpsIndirectDomain entry is created, its key and timestamp are passed to the HttpsBrowser entry, which records the key and timestamp. In at least one embodiment, the key and timestamp are recorded in a sorted linked list. This allows the key and timestamps to be maintained (from the Browser's perspective) in a FIFO fashion, thus making the determination of least recently opened easy less complex. According to an embodiment, the key is based on a hash of the acceleration tunnel ID, browser ID, and server domain. The HttpsIndirectDomain entry keeps a reference to its HttpsBrowser entry. This improves the HttpsIndirectDomain object's ability to remove its key and timestamp from the HttpsBrowser entry (from its linked list) when the web page closes.

The HttpsBrowser entry also determines whether conditions permit the HttpsIndirectDomain entry's web page to be considered a measurable web page. For a web page to be considered a measurable web page a minimum period of time (configurable, default=2000 ms) must have elapsed since any other in-page activity for the Browser and since the prior measurable Https web page was closed. The end of a web page is identified by the arrival time of the last "big" packet (compile-time constant, default=800 bytes) packet on any of the flows which are in-page for the web page in question. The multiphase classifier IP flow object managing the HTTPS response part of a transaction records the time of each "big HTTPS response packet" as it processes the packet and passes that timestamp (and the response size in bytes) to the InPageCache when it either does its periodic reporting while open or closes the transaction. When a measurable web page's HttpsIndirectDomain entry's HTTPS transaction closes along with experiencing an absence of reports from in-page transactions, the web page as a whole is closed. The web page's characteristics (number of transactions, number of HTTPS connections and number of bytes) are evaluated and if they qualify, the web page's response time and related stats are logged in the appropriate log files.

Figure 7:
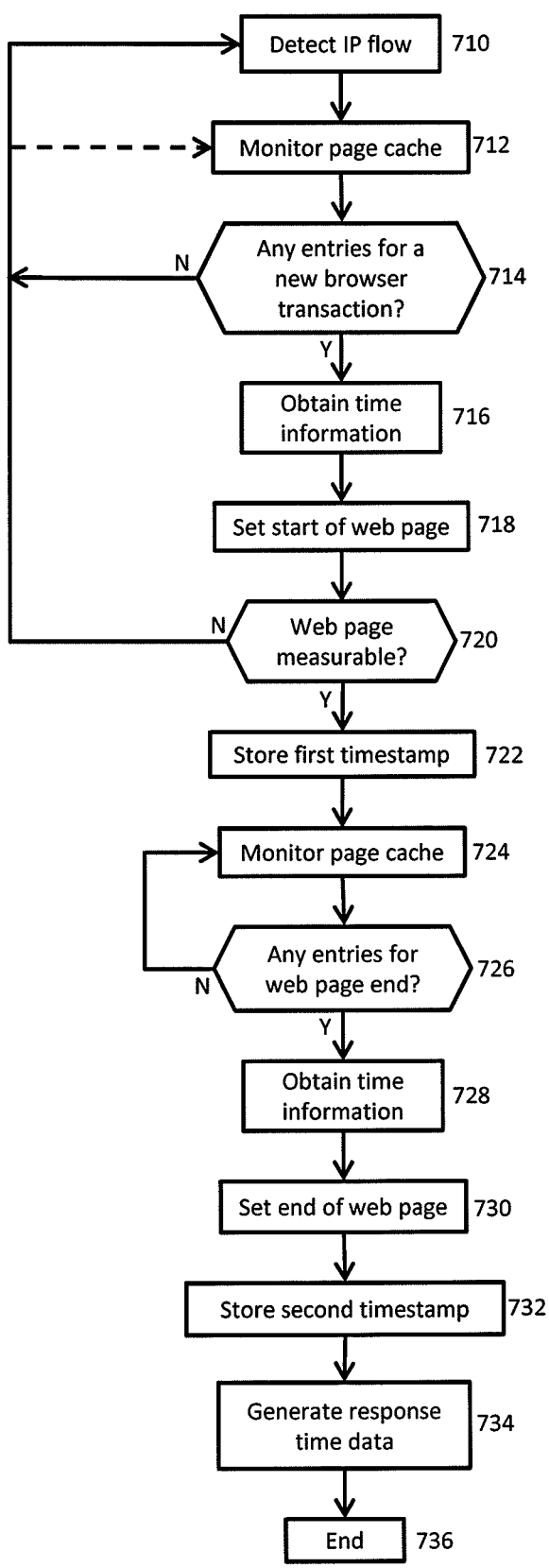
FIG. 7 is a flowchart illustrating a process for measuring web page response time, according to at least one embodiment.

FIG. 7 is a flowchart illustrating the steps performed in measuring web page response times in accordance with one or more embodiments. At 710, traffic data in a communication network is monitored in order to detect and IP flow. At 712, the page cache is monitored in order to determine whether any activity has occurred. At 714, it is determined whether any of the activities correspond to an entry for a new browser transaction in the page cache. If no entries for a new browser transaction are detected, then control returns to 712 where the page cache can be continually monitored. According to at least one embodiment, control can optionally return to 710 in order to detect a subsequent IP flow. According to other embodiments, however both options can be performed.

If an entry has been made in the page cache for a new browser transaction, control passes to 716. Time information is obtained from the entry at this point. According to an embodiment, the time information obtained can correspond to the timestamp specifying creation of the entry and start of the web page download. At 718, the time information is used to set the start of the web page. At 720 it is determined whether or not the web page qualifies as a measurable web page. If the web page does not qualify, control returns to 712 were the page cache continues to be monitored.

According to at least one embodiment, various criteria must be satisfied in order for the web page to be considered measurable. First, the page cache must be monitored in order to identify subsequent transactions for the same browser and web page combination. Next, entries in the page cache must specify that a minimum interval has elapsed since the occurrence of any past transactions for the same browser and web page combination since a prior measurable web page was closed. If both conditions are met, then the web page is considered to be measurable. Accordingly, control passes to 722.

At 722, a first timestamp is set based on the time information previously obtained for the new browser transaction. The page cache continues to be monitored at 724, and at 726, it is determined whether any entries for the web page have been made in the page cache. If no entries have been made, then control returns to 724 where the page cache continues to be monitored. If an entry has been discovered which indicates that the web page has ended, then control passes to 728. The time information corresponding to when the entry was made is obtained at 728. At 730, the end of the web page is set based on the time information obtained. At 732, a second timestamp is stored in order to identify the end of the web page retrieval. At 734, response time data is generated for the web page. The process ends at 736. According to at least one embodiment, the response time data can be in the form of statistical information for the web page that is based on the first timestamp and the second timestamp. Furthermore, additional information such as, for example, the number of measurable web pages can also be utilized in providing the response time data.

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
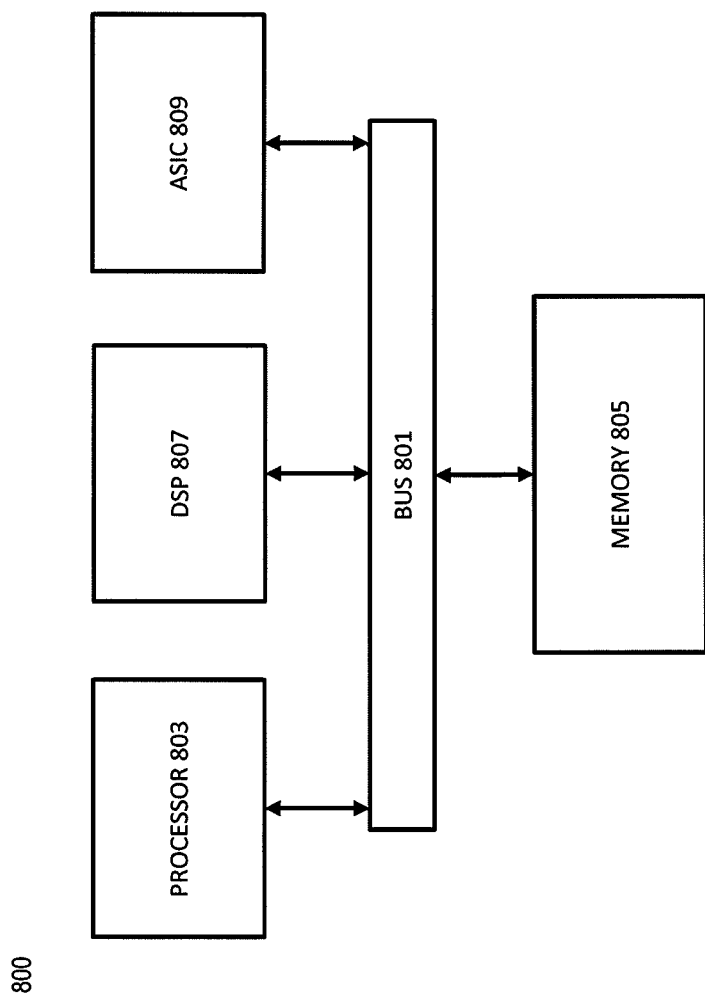
FIG. 8 is a diagram of a chip set that can be used to implement various exemplary embodiments.

FIG. 8 illustrates a chip set 800 upon which various embodiments may be implemented. Chip set 800 is programmed to implement various features as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of the foregoing embodiments.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein to controlling a set-top box based on device events. The memory 805 also stores the data associated with or generated by the execution of various steps in the foregoing embodiments.

Figure 9:
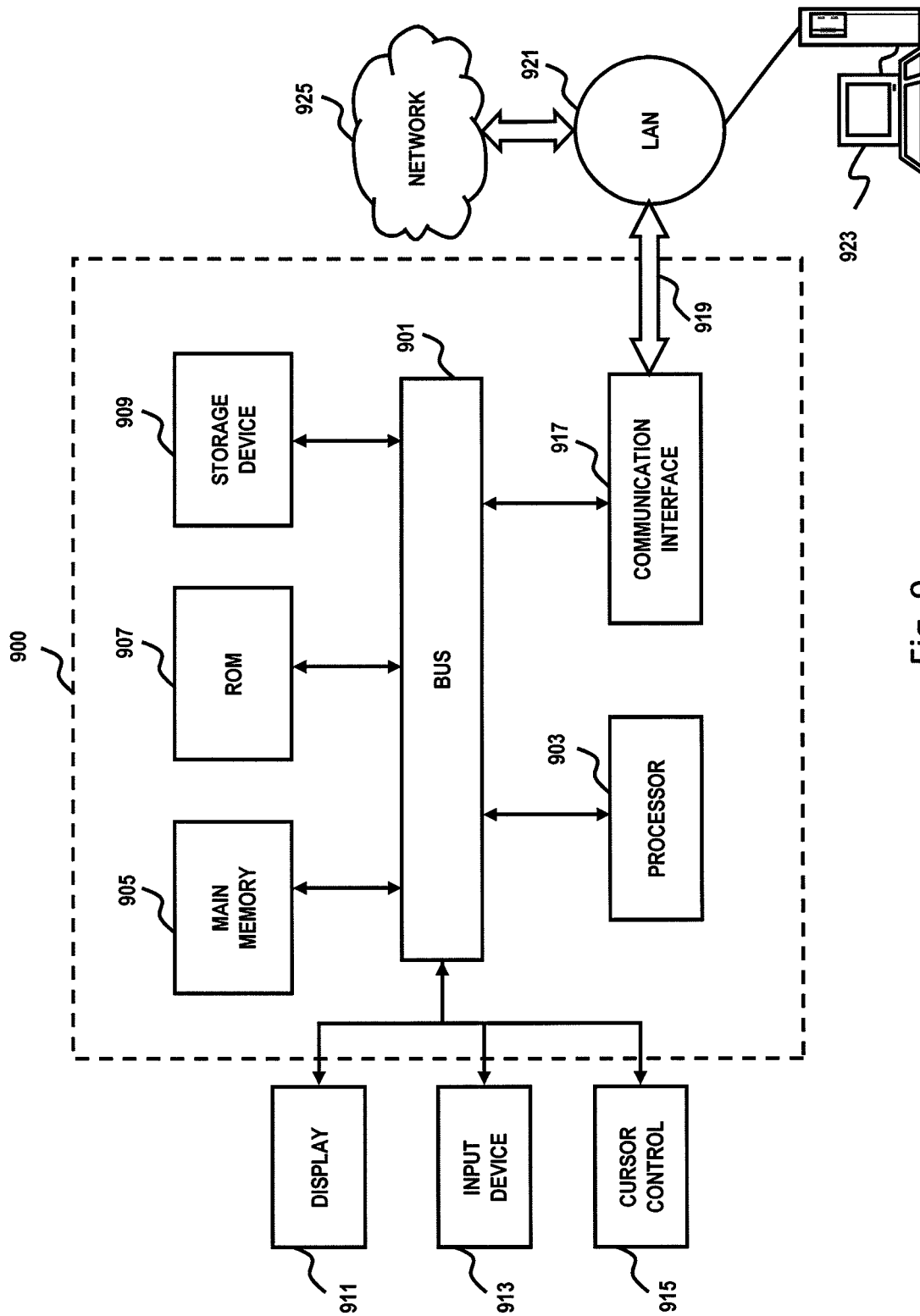
FIG. 9 is a diagram of a computer system that can be used to implement various exemplary embodiments.

FIG. 9 is a diagram of a computer system that can be used to implement various embodiments. The computer system 900 includes a bus 901 or other communication mechanism for communicating information and a processor 903 coupled to the bus 901 for processing information. The computer system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a light emitting diode (LED) or other flat panel displays, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911. Additionally, the display 911 can be touch enabled (i.e., capacitive or resistive) in order facilitate user input via touch or gestures.

According to an exemplary embodiment, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multiprocessing arrangement may also be employed to execute the instructions contained in main memory 905. In alternative embodiments, hard-wired circuitry may be used in place of or in combination with software instructions to implement exemplary embodiments. Thus, exemplary embodiments are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, or any other communication interface to provide a data communication connection to a corresponding type of communication line. As another example, communication interface 917 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a High Definition Multimedia Interface (HDMI), etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 such as a wide area network (WAN) or the Internet. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an exemplary embodiment through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Non-volatile media can further include flash drives, USB drives, microSD cards, etc. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising
identifying, at a gateway, an IP flow from traffic data in a communication network, the IP flow including two or more packets having common transport level end points;
assigning a preliminary classification indicative of at least a priority to the IP flow based on protocol information contained in a first packet of the IP flow;
creating an entry in an IP flow cache which maintains information pertaining to all open IP flows;
consulting a cache including previous domain name and server IP address associations obtained from analysis of prior IP flow and/or UDP domain name lookups;
determining a domain name associated with a server end of the IP flow based on the consulting;
associating the domain name with the IP flow; and
assigning an initial classification indicative of at least a priority to the IP flow based, at least in part, on the domain name and an early classification cache lookup, wherein entries in the early classification cache are keyed either by a network identifier index, domain name, and server port number, or by a network identifier index, server domain, and server port number,
wherein the initial classification replaces the preliminary classification.

2. The method of claim 1, wherein the preliminary classification is further based on the first packet's IP address, port number, size, one or more classification override rules, or a combination thereof.

3. The method of claim 1, further comprising updating the cache based on the assigned initial classification.

4. The method of claim 1, further comprising:
monitoring the IP flow to determine a size, arrival time, or both for packets arriving after assigning the initial classification; and
reclassifying the IP flow based, at least in part, on results of the monitoring and one or more classification override rules.

5. The method of claim 4, wherein reclassifying the IP flow is only performed if a classification of the reclassified IP flow: differs from the initial classification, results in a higher priority classification than the initial classification, more accurately represents the IP flow, or a combination thereof.

6. The method of claim 4, further comprising updating the cache based on the reclassified IP flow.

7. A gateway comprising
one or more processors configured to:
identify an IP flow from traffic data in a communication network, the IP flow including two or more packets having common transport level end points;

assign a preliminary classification indicative of at least a priority to the IP flow based on protocol information contained in a first packet of the IP flow;

create an entry in an IP flow cache which maintains information pertaining to all open IP flows;

consult a cache including previous domain name and server IP address associations obtained from analysis of prior IP flow and/or UDP domain name lookups;

determine a domain name associated with a server end of the IP flow based on the consulting;

associate the domain name with the IP flow; and assign an initial classification indicative of at least a priority to the IP flow based, at least in part, on the domain name and an early classification cache lookup, wherein entries in the early classification cache are keyed either by a network identifier index, domain name, and server port number, or by a network identifier index, server domain, and server port number, wherein the initial classification replaces the preliminary classification.

8. The gateway of claim 7, wherein the preliminary classification is further based on the first packet's IP address, port number, size, one or more classification override rules, or a combination thereof.

9. The gateway of claim 7, further comprising updating the cache based on the assigned initial classification.

10. The gateway of claim 7, further comprising:
monitoring the IP flow to determine a size, arrival time, or both for packets arriving after assigning the initial classification; and
reclassifying the IP flow based, at least in part, on results of the monitoring and one or more classification override rules.

11. The gateway of claim 10, wherein reclassifying the IP flow is only performed if a classification of the reclassified IP flow: differs from the initial classification, results in a higher priority classification than the initial classification, more accurately represents the IP flow, or a combination thereof.

12. The gateway of claim 10, further comprising updating the cache based on the reclassified IP flow.

* * * * *